United States Patent
Liogier D'ardhuy et al.

(10) Patent No.: US 7,791,814 B2
(45) Date of Patent: Sep. 7, 2010

(54) OPTICAL ELECTROWETTING DEVICE

(75) Inventors: Gaëtan Liogier D'ardhuy, Lyons (FR);
Mathieu Maillard, Lyons (FR); Julien Legrand, Lyons (FR); Bruno Berge, Lyons (FR)

(73) Assignee: Varioptic, Lyons (FR)

( * ) Notice: Subject to any disclaimer, the term of this patent is extended or adjusted under 35 U.S.C. 154(b) by 221 days.

(21) Appl. No.: 11/700,171

(22) Filed: Jan. 31, 2007

(65) Prior Publication Data
US 2007/0177276 A1    Aug. 2, 2007

Related U.S. Application Data

(60) Provisional application No. 60/763,891, filed on Feb. 1, 2006.

(30) Foreign Application Priority Data

Feb. 1, 2006  (EP) .................... 06356011
May 31, 2006  (EP) .................... 06356061

(51) Int. Cl.
*G02B 1/06* (2006.01)
(52) U.S. Cl. ...................... 359/665; 359/666
(58) Field of Classification Search .......... 359/665–667
See application file for complete search history.

(56) References Cited

U.S. PATENT DOCUMENTS

| | | | | |
|---|---|---|---|---|
| 6,449,081 | B1* | 9/2002 | Onuki et al. | 359/245 |
| 7,301,709 | B2* | 11/2007 | Shinohara et al. | 359/665 |
| 7,311,398 | B2* | 12/2007 | Kuiper et al. | 351/161 |
| 2004/0055536 | A1* | 3/2004 | Kolar et al. | 118/626 |
| 2006/0126190 | A1* | 6/2006 | Berge et al. | 359/665 |
| 2008/0137213 | A1* | 6/2008 | Kuiper et al. | 359/666 |
| 2008/0259463 | A1* | 10/2008 | Shepherd | 359/666 |

\* cited by examiner

*Primary Examiner*—Jordan M. Schwartz
(74) *Attorney, Agent, or Firm*—Osha • Liang LLP

(57) ABSTRACT

The invention relates to an optical electrowetting device comprising a conductive fluid (5; 101) and a non-conductive fluid (4; 102), said fluids being non miscible, and an insulating substrate (2; 103) on which both fluids are in contact and form a triple interface, wherein the natural contact angle (105) of the non-conductive fluid (102) on the substrate (103) in presence of the conductive fluid (101) is comprised between 0° and about 20°. This device may be a variable focus liquid lens, an optical diaphragm, an optical zoom. The invention further relates to an apparatus such as a camera, a cell phone, an endoscope or a dental video camera, comprising said electrowetting device and a driver or electronic means for controlling the lens.

18 Claims, 4 Drawing Sheets

OPTICAL ELECTROWETTING DEVICE

FIELD OF THE INVENTION

The invention relates to an optical electrowetting device. In particular the invention relates to an optical liquid lens driven by electrowetting containing a device of the invention.

BACKGROUND

Optical electrowetting devices are devices capable of modifying an incident beam to achieve a specific optical function. They include variable focus liquid lenses, optical diaphragms, optical zooms, ophthalmic devices and are increasingly proposed in a number of applications and apparatuses, such as for example cameras, cell phones, telemeters, endoscopes, dental video cameras and the like.

An optical lens driven by electrowetting and of variable focal length is described for example in European Patent EP-B1-1,166,157, the content of which is incorporated herein by reference. FIG. 10 of the present application corresponds to FIG. 12 of that patent. A cell is defined by a fluid chamber comprising a lower plate 10 and an upper plate (not shown), and a perpendicular (normal to), or substantially perpendicular (normal to), axis 0. The lower plate, which is non-planar, comprises a conical or cylindrical depression or recess 6, which contains a non-conductive or insulating fluid 2. The remainder of the cell is filled with an electrically displaceable conductive fluid 8 along the axis 0.

The fluids are non-miscible, in contact over a meniscus (A, B), and have a different refractive index and substantially the same density. The cell comprises an electrical insulating substrate 4, arranged on at least an area of the lower plate 10, on which both fluids are in contact.

The thickness of the insulating substrate is preferably comprised between about 0.1 µm and about 100 µm. Generally, small thickness is to be used for optical electrowetting devices working at low voltage, whereas thick insulating substrate is used for high voltage applications.

The conductive fluid generally is a salt containing-aqueous fluid. The insulating fluid is typically an oil, an alkane or a mixture of alkanes, possibly halogenated.

The optical quality of an optical electrowetting device may vary in the conditions of use, depending on various parameters.

Importantly, the optical liquid lenses driven by electrowetting may present a focal hysteresis, meaning that their optical powers differ depending on voltage ramp direction, increasing or decreasing. In other words, the focal length of the device at a given voltage value may be different depending on whether the tension is increasing or decreasing and the interface between the conductive and the non-conductive fluids is moving towards or inwards with respect to the axis of the cell. It has been found that this phenomenon is related to contact angle hysteresis. It has finally been found that a degradation of the optical quality is associated with such a hysteresis.

SUMMARY

One objective of the invention is to provide an optical electrowetting device having improved optical properties.

Another objective of the invention is to provide such a device having low or no focal and/or angle hysteresis.

Another objective of the invention is to provide such a device that is usable on a wide range of temperature while keeping its low or zero hysteresis properties.

Another objective is to provide such a device that keeps at least substantially unchanged its time response to electrical impulsion in either voltage ramp directions, increasing or decreasing, on a wide range of temperature.

Another objective is to provide such a device that keeps at least substantially unchanged its optical properties such as transparency on a wide range of temperature.

Still another objective is to provide such a device that can be used as a variable focus liquid lens, optical diaphragm, optical zoom and any other optical device using electrowetting in an inside or outside environment.

In one aspect the present invention relates to an optical electrowetting device comprising a conductive fluid and a non-conductive fluid, said fluids being non miscible, and an insulating substrate on which both fluids are in contact and form a triple interface, wherein the natural contact angle $\theta_n$ of the non-conductive fluid on the substrate in presence of the conductive fluid is comprised between 0° and about 20°, preferably above 0° and about 20°, more preferably between about 5° and about 20, most preferably between about 5° and about 16°, over a range of temperature comprised between −10° C. and +60° C., preferably between about −20° C. and about +70° C.

The embodiments of the invention may further comprise one or several of the following features:

- the device comprises means for applying or allowing to apply an alternative tension on the conductive fluid;
- the insulating substrate is arranged homogeneously on the lower plate;
- the insulating substrate comprises or is made of a transparent material;
- the insulating substrate is made of or comprises an upper layer which is made of, a material that is wettable by the non-conductive fluid;
- the said material that is wettable by the non-conductive fluid is hydrophobic;
- the said material that is wettable by the non-conductive fluid has a surface energy that is compatible with the conductive and non-conductive fluids so as to provide a natural contact angle within the range according to the invention;
- the natural contact angle—and thus the choice of the said material and of the fluids is done by the one skilled in the art in this respect—is kept within the above recited range, over a range of temperature comprised between −10° C. and +60° C., preferably between about −20° C. and about +70° C.;
- the triple interface is circular.

BRIEF DESCRIPTION OF THE DRAWINGS

The present invention will now be described in further details by way of non-limiting examples and by reference to the attached drawings.

| Non-conductive fluid | | Conductive fluid | |
|---|---|---|---|
| T23/SIP 6827 | 20% | Water | 39.7% |
| DC 702 | 59.4% | Na$_2$SO$_4$ | 0.2% |
| 1,8-dichlorooctane | 20% | Benzalkonium chloride | 0.1% |
| BHT | 0.6% | 1,2-Propanediol | 60% |

Figure 7:
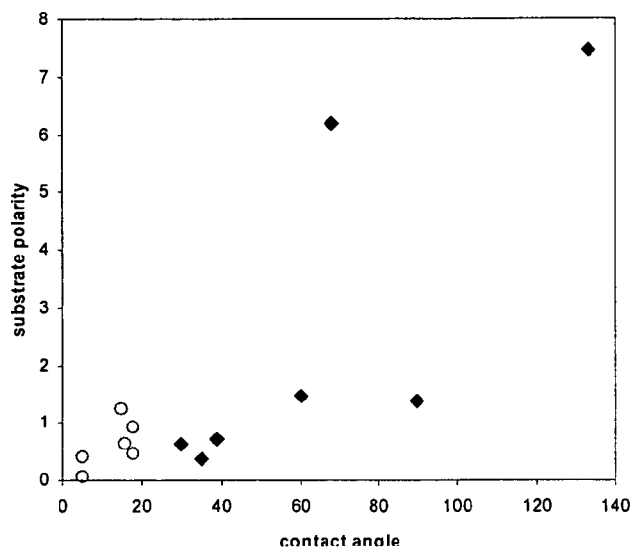

FIG. 7 is a graph showing the relation between substrate polarity (mN/m) and contact angle for a non conductive fluid ($y_L$=25±1 mN/m) in presence of a conductive fluid ($y_L$=44±1 mN/m).

Figure 8:
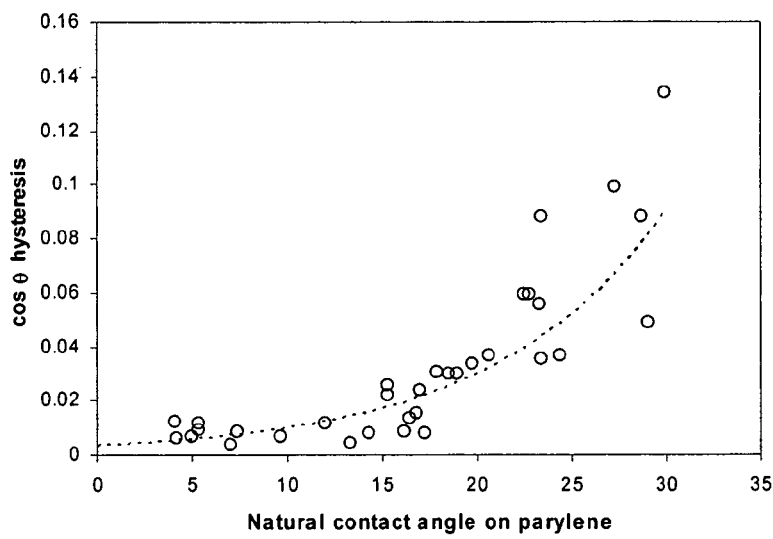

FIG. 8 is a graph showing the maximum contact angle hysteresis on Parylene C depending on natural contact angle, measured between the natural contact angle and above 60°.

Figure 9:
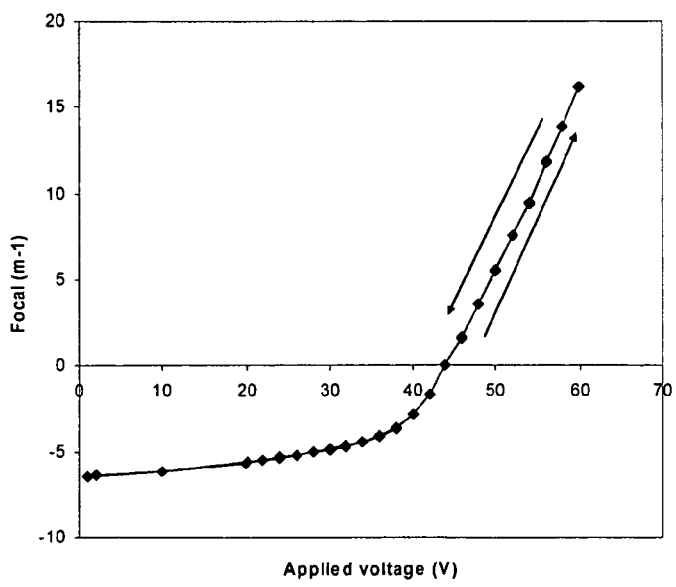

FIG. 9 is a graph showing an improved focal hysteresis in a liquid lens according to the invention.

Figure 10:
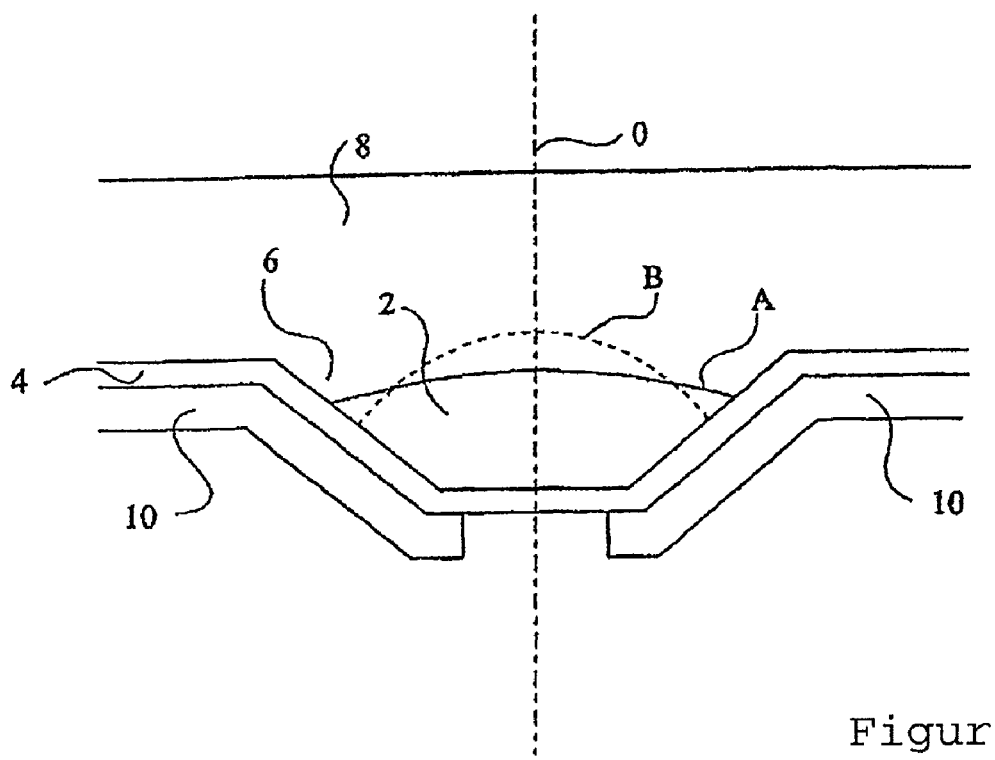

FIG. 10 is an optical lens cell in accordance with the prior art.

DETAILED DESCRIPTION

Figure 1:
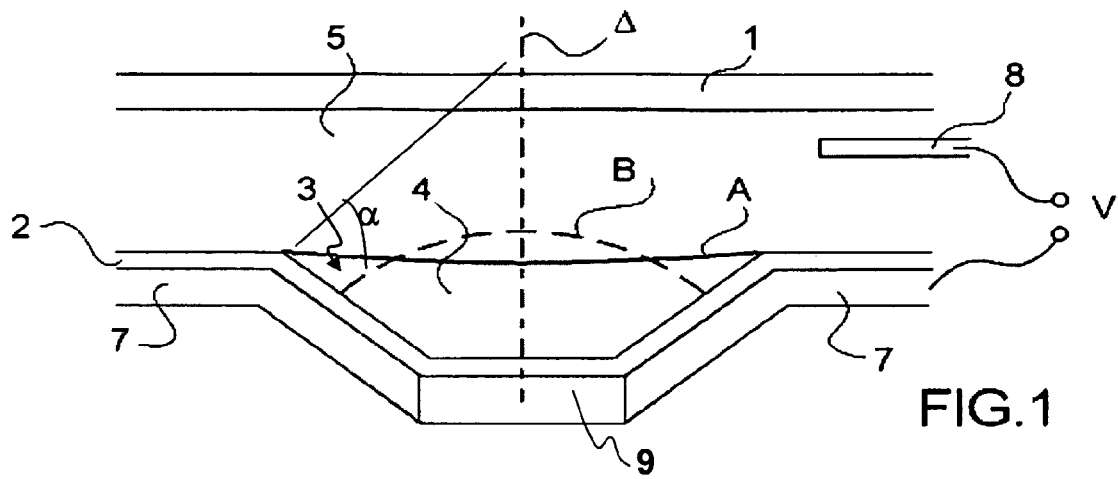
FIG. 1 is a simplified cross-section view of a variable-focus liquid lens according to the invention.

In FIG. 1, a cell is defined by a fluid chamber comprising a lower plate 7, 9 and an upper plate 1, and a perpendicular (normal to), or substantially perpendicular (normal to), axis Δ. The lower plate, which is non-planar, comprises a conical or cylindrical depression or recess 3, which contains a non-conductive or insulating fluid 4. The remainder of the cell is filled with an electrically displaceable conductive fluid 5 along the axis Δ.

The fluids are non-miscible, in contact over a meniscus (A, B), and have a different refractive index and substantially the same density. The cell comprises an electrical insulating substrate 2, arranged on at least an area of the lower plate, on which both fluids are in contact.

In FIG. 1, the insulating substrate covers the entire lower plate, but it may be limited to an area of the lower plate on which both fluids are in contact. A first electrode is separated from the conductive fluid and the insulating fluid by the insulating substrate. In this example, the lower plate comprises a conductive body 7 acting as the first electrode and a transparent window 9 for the passage of the beam of light. The conductive body in FIG. 1 is used for the centering of the non conductive liquid. Another electrode 8 is in contact with the conductive fluid. The wettability of the insulating substrate by the conductive fluid varies under the application of a voltage V between the first and the second electrodes, such that through electrowetting phenomena it is possible to modify the shape of the meniscus, depending on the voltage V applied between the electrodes. Thus, a beam of light passing through the cell normal to the plates in the region of the drop will be focused to a greater or lesser extent according to the voltage applied. Voltage V may be increased from 0 volt to a maximum voltage, which depends on the used materials. For example, when the voltage increases, the non-conducting liquid drop 4 deforms to reach a limiting position (designated as B). While drop 4 deforms from its position A (rest position, without tension, concave interface with conductive fluid 5) to its position B (convex interface with conductive fluid 5), the focus of the liquid lens varies.

Figure 3:
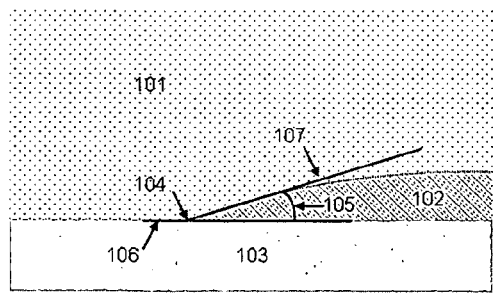
FIG. 3 is a schematic description of the natural angle of a non conductive liquid on a surface in presence of a conductive liquid.

Referring to FIG. 3, the natural contact angle $\theta_n$ (numerical reference 105) of an non conductive fluid 102 on a planar substrate 103 in presence of a conductive fluid 101 is defined by the angle through the non-conductive fluid formed between the tangent 106 to the planar substrate and the tangent 107 to the surface of the non-conductive fluid, both measured at the point of the triple interface 104 between the substrate and the two fluids, when no voltage is applied.

As it will appear from the present specification, the insulating substrate in the optical electrowetting device may not be planar and may rather present a recess. However, the natural contact angle according to the invention is the contact angle measured on a planar substrate made of the same material as the insulating substrate of the final device. The natural contact angle may be measured at room temperature, say between about 20 and about 25° C. It may also be measured at various temperatures within the recited use temperature range.

Application of a voltage to the conductive fluid favours the wettability of the substrate by the conductive fluid. This leads to a deformation of the triple interface, and a variation of the contact angle of the non-conductive fluid with respect to the insulating substrate, the contact angle being defined, as previously, by the angle formed between the tangent to the insulating substrate and the tangent to the surface of the non-conductive fluid, both measured at the point of the triple interface between the insulating substrate and the two fluids. The variation of the contact angle induces a modification of the shape of the meniscus defined by the fluid-fluid interface, and therefore a modification of the focal length of the device.

With a natural contact angle within the recited range, the contact angle hysteresis and the focal hysteresis are kept low, near zero or equal to zero. Contact angle hysteresis may be regarded as the difference of contact angle of the non-conductive fluid on the insulating substrate at a given voltage value between the increasing voltage ramp and the decreasing voltage ramp. According to a feature, the contact angle hysteresis is kept below a given value expressed as follows:

$$\Delta \cos \theta_n = |\cos \theta_1 - \cos \theta_2| \leq \text{about } 0.06, \text{ preferably } \leq \text{about } 0.04, \text{ more preferably } \leq \text{about } 0.02,$$

wherein $\theta_1$ and $\theta_2$ are the angles formed between the tangent to the substrate and the tangent to the surface of the non-conductive fluid, measured at the point of the triple interface, for a same value of voltage, $\theta_1$ being the value for the increasing voltage ramp direction and $\theta_2$ for the decreasing voltage ramp direction.

According to a feature, the surface energy of the insulating substrate is chosen to be compatible with the nature of the fluids so as to give rise to a natural contact angle within the recited range.

In an advantageous feature, the non-conductive fluid includes a component having a surface tension $y_L$ close to the surface energy of the insulating substrate.

In another feature, the non-conductive fluid has a surface tension $y_L$ close to the surface energy of the insulating substrate.

In a preferred feature, the difference $d_{st}$ between the surface tension $y_L$ of the non-conductive or said non-conductive fluid component and the surface energy of the insulating substrate is within the range about $-15 \leq d_{st} \leq$ about +15 mN/m (milliNewton/meter), preferably said surface energy is within the range about $-12 \leq d_{st} \leq$ about +12 mN/m.

Surface energy includes a dispersive component and a polar component also called surface polarity. In a preferred feature, the insulating substrate has a low surface polarity or low polar component. Preferably, the substrate polar component is as low as possible, typically comprised between 0 and about 4 mN/m. More preferably, it is comprised between 0 and about 2 mN/m. The polar component may be measured as disclosed in F. M. Fowkes, *A.C.S. Advances in chemistry series*, 43, (1964), 99-111 and Arthur W. Adamson, *Physical Chemistry of surfaces*, Wiley, fifth edition (1990).

In a feature, the insulating substrate has a surface energy above about 30 mN/m.

In another feature, the insulating substrate has a surface energy below about 30 mN/m.

In another feature, the insulating substrate is made of an insulating material. This material is wettable by the non-conductive fluid in presence of the conductive fluid, so that the natural contact angle is comprised between 0° and about 20°.

In another feature, the insulating substrate comprises an insulating material and an upper layer made of a material which is wettable by the non-conductive fluid in presence of the conductive fluid, so that the natural contact angle is comprised between 0° and about 20°.

Advantageously, the natural contact angle is above zero. When the natural contact angle is equal or very close to zero, oil may totally spread out on the hydrophobic surface. In an optical electrowetting device, oil might eventually migrate out of the conical recess, particularly when using low viscosity fluids, and the device specification might change over time. Using fluids having natural contact angle above zero is thus particularly advantageous when using low viscosity fluids.

Advantageously, the optical electrowetting device is driven by an alternative current (AC) rather than a continuous tension (Direct Current: DC). This specific feature allows lowering the contact angle hysteresis of a non conductive fluid droplet in a conductive fluid, and consequently leads to a lowering of the optical power hysteresis of an optical electrowetting device. This phenomenon has been experimentally observed and theoretically described as a way to reduce the friction at the interface between the fluid frontline and the substrate.

The Insulating Substrate:

In an optical electrowetting device, such as for example optical liquid lenses controlled by electrowetting, the insulating and hydrophobic layer(s) is(are) in contact with a non conductive fluid (usually organic liquid phase which is non polar) and with a conductive fluid (usually a polar phase). Dielectric properties (dielectric constant, breakdown voltage, dissipation factor) of the insulating layer must be retained over time when in contact with said two different fluids (polar and non polar phase), over the widest temperature range possible, ideally between −40° C. and 85° C. Moreover, the insulating—hydrophobic layer(s) should present no or limited physical and chemical interaction with said both fluids present in the optical electrowetting device.

Moreover, on the window of the optical electrowetting device, the hydrophobic layer to be coated on the surface has to facilitate the wetting of non conductive fluid in the conductive fluid.

According to the present invention, the insulating substrate of the optical electrowetting device is made of, or comprises an upper layer which is made of, a material presenting one or more of the following features:

the material is an electrically insulating dielectric material;

the material is hydrophobic and/or of low polarity, preferably a polarity comprised between about 0 mN/m and about 4 mN/m;

the insulating material is a polymer having a low relative dielectric constant $\in_r$, preferably lower than about 3.5 at 1 kHz when used as a wettable surface, or the insulating material is an inorganic layer having a high relative dielectric constant $\in_r$, preferably greater than about 3.5 at 1 kHz and is covered with a layer of hydrophobic material;

the insulating material has a high breakdown voltage, typically greater than about 1 MV/cm, advantageously greater than about 2 MV/cm, to minimize short circuit risks and increase the dielectric life time;

the insulating material has a low dissipation factor D, typically lower than about 0.05, aiming a low consumption device;

the material has a high reliability (i.e. is not damaged) over a wide period of time and on a wide temperature range, especially between −40° C. to +85° C.;

the material has no or only limited physical and chemical interaction with the conductive and the non conductive fluids, i.e. is highly resistant to most chemicals;

the material has no or only limited water absorption, typically less than about 0.3% per 24 h;

the material is not soluble in the conductive and non-conductive fluid between −40° C. and +85° C.;

the material has high transparency (transmission >90% in visible wavelength) and/or low optical dispersion;

the material has a good adhesion on the lower plate, typically better or equivalent to 3B according to adhesion test ASTM D3359-02, in order to prevent from spontaneous delamination of the insulation substrate in presence of the fluids;

the material has a low UV and visible absorption to limit, preferably to avoid, temperature rise during light irradiation of the device and to prevent/avoid from chemical reactions between with the insulating substrate and the fluids in contact;

the material has high melting temperature and high glass transition temperature, preferably above 85° C.

In a feature, the insulating substrate is used as a coating on the lower plate. This lower plate can be made of any appropriate material like metal, polymer or inorganic material that is not damaged during the deposition process and that has the other properties necessitated by its use, for instance transparency in the region of the lens requiring transparency. Each material may be associated with a usual coupling agent, used to improve the coating adhesion. This coupling agent is deposited on the lower plate prior to the coating process.

In the present specification, for either or both the conductive and non-conductive fluids, as well as for the all parts of the optical electrowetting device and said optical electrowetting device in its entirety, transparency is to be understood as a transmission of more than about 96% over a wavelength range of from about 400 nm to about 700 nm and/or a scattering energy of less than about 2% in an about 60° (degrees) cone around the direct incidence in the same wavelength range.

In a feature, a non-conductive fluid containing a compound of surface tension equal or above, preferably above, about 28 mN/m is used with an insulating substrate having a high surface energy, typically equal to or greater than about 30 mN/m, for example Parylene type polymers, divinylsiloxane-benzocyclobutene type polymers, and the like.

In another feature, a non-conductive fluid containing a compound of surface tension equal or below, preferably below, about 28 mN/m is used with an insulating substrate having a low surface energy, typically equal to or less than about 30 mN/m, for example Teflon® AF, Cytop®, and the like.

In a preferred embodiment, insulating materials of high surface energy, typically greater than about 50 mN/m, are advantageously coated with a hydrophobic material, typically having a surface energy less than about 45 mN/m, with a low polarity, typically less than about 2 mN/m.

Examples of insulating and/or hydrophobic materials are shown below:

Insulating Materials
- Silicon oxide ($SiO_2$);
- Silicon nitride ($Si_3N_4$);
- Barium titanium oxide ($BaTiO_3$);
- Hafnium oxide ($HfO_2$);
- Hafnon ($HfSiO_4$);
- Zircon oxide ($ZrO_2$);
- Tantalum oxide ($Ta_2O_5$);
- Titanium oxide ($TiO_2$);
- Barium strontium titanium oxide ($BaSrTiO_3$);
- Strontium titanium oxide ($SrTiO_3$);
- Aluminium oxide ($Al_2O_3$);
- Lanthanum oxide ($La_2O_3$);
- Yttrium oxide ($Y_2O_3$);
- Insulating sol-gels, such as those based on silicon alkoxides;
- "Spin on glass", such as Accuglass® from Honeywell;
- SSQ, i.e. porous organosilicate film materials (silsesquioxane);
- MSSQ, i.e. porous organosilicate film materials (methyl-silsesquioxane);
- Polyimide polymers;
- Fluorinated polyimide polymers;
- SiLK semiconductor dielectric resin (trademark of the Dow Chemical Company);
- Fluorine doped silicon oxides, i.e. fluorosilicate glass (such as FSG);
- Fluorinated amorphous carbon thin films (a-C:F).

Insulating and Hydrophobic Materials
- Silicone polymers PDSM;
- Amorphous fluoro polymers, such as Teflon® AF 1600 and AF 1601 from DuPont;
- Poly(arylene ethers);
- Fluorinated poly(arylene ethers);
- para-Xylylene linear polymers, fluorinated or not, such as parylenes, for example Parylene C, Parylene F or Parylene AF-4, Parylene VT-4, Parylene N or Parylene D;
- Amorphous fluoro polymers, such as Cytop® from Asahi Glass Co;
- Hyflon® polymer from Solvay;
- Aromatic vinyl siloxane polymers, such as Divinylsiloxane-benzocyclobutene (DVS-BCB) polymer from Dow Chemical;
- Diamond like carbon (DLC);
- Poly(tetrafluoroethylene);
- Polyethylene;
- Polypropylene;
- Fluoro ethylene propylene polymer.
- Polynaphthalene;
- Fluorinated polynaphthalene;
- Silicone-like polymeric films $SiO_xC_yH_z$.

It should be understood that the insulating substrate may comprise one, two or more of the above-listed materials. According to another embodiment, the insulating substrate may also comprise one or more antioxidant.

As illustrative examples, the insulating substrate is made of, or comprises an upper layer which is made of, a material, or materials, that may be chosen among the following materials:

- para-Xylylene linear polymers, such as those produced by vaporization of the dimer di-para-xylylene at a temperature of between about 130° C. to about 175° C., pyrolization of the dimer gas into a monomer of para-xylylene at a temperature of between about 600 to about 700° C., condensation and polymerization into a transparent polymer film. Examples include:
  - Parylene C obtained as described above;
  - Parylene N that is similar to Parylene C except that a chlorine atom is substituted by a hydrogen atom;
  - Parylene F (or Parylene AF-4 commercialized by Specialty Coatings Systems as Parylene HT®) that is similar to Parylene N except that methyl group are replaced by fluorinated methyl groups; and
  - Parylene VT-4, a poly(tetrafluoro-para-xylylene) having a similar structure to Parylene F, except that the four atoms in a repeating unit are attached to the benzene ring, and not to the aliphatic C atoms;
- fluorinated polymers like copolymers of tetrafluoroethylene and 2,2-bis(trifluoromethyl)-4,5-difluorodioxole such as those commercialized by Dupont under the name Teflon® AF1601 and Teflon® AF1600; these polymers are solubilized in a fluorinated solvent such as FC40 or FC75 commercialized by 3M. The polymer solution may be deposited by spin-coating or dip-coating and the polymer film is formed after solvent evaporation;
- aromatic vinyl siloxane type polymers, such as divinylsiloxane-benzocyclobutene polymer (also named DVS-BCB or BenzoCycloButene or Cyclotene®, from Dow Chemical). This polymer may be spin-coated or dip-coated on a substrate and the polymer may be formed by a baking process; the polymerization is thermally activated, and corresponds to the selective reaction between the vinyl group (C=C) and the cyclobutene group from two monomers;
- cyclic perfluorinated type polymers, such as Cytop® from Asahi Glass Co., which is a perfluorinated polymer bearing perfluorofurane groups, obtained by cyclopolymerization of perfluoro(alkenylvinylether). Cytop® is an amorphous fluorinated polymer, thus similar to Teflon® AF and solubilized in a fluorinated solvent. The polymer solution may be deposited by spin-coating or dip-coating and the polymer film is formed after solvent evaporation.

According to a feature, preferred insulating materials are chosen from among Teflon®, parylenes, aromatic vinyl siloxane type polymers and cyclic perfluorinated type polymers. Particularly preferred insulating materials are Parylene N, Parylene C, Parylene F or Parylene AF-4, Parylene VT-4, DVS-BCB polymer, Cytop®. Most preferred insulating materials are chosen from among Parylene F or Parylene AF-4, Parylene VT-4, DVS-BCB polymer and Cytop®, particularly preferred are Parylene F or Parylene AF-4 and DVS-BCB polymer.

According to a preferred embodiment, the insulating substrate is made of, or comprises an upper layer which is made of, Parylene F (or Parylene AF-4 [poly(α,α,α',α'-tetrafluoro-para-xylylene)] or Parylene HT™ (fluorinated parylene like parylene F or parylene AF-4), both commercialized by SCS, Specialty Coating Systems, Parylene F corresponding to a fluorinated polymer of formula:

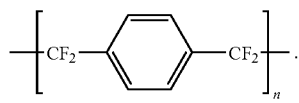

Parylene F is a good insulator with low dissipation factor (D=0.0002 at 60 Hz and D=0.002 at 1 kHz), with a surface energy of about 31 mN/m±1 mN/m, and has a low polar surface energy component (<2 mN/m). Parylene F (or Parylene AF-4) films presenting a thickness d comprised between about 0.5 µm and about 10 µm, have a relative dielectric constant $\in_r$ ranging from about 2.2 to about 2.4 (see Harrus et al., *Proceedings of the symposium on semiconductors and integrated circuits technology,* 52, (1997), 76; S. Dabral et al., *J. Vac. Sci. Technolo., B*11(5), (1193), 1825).

Parylene F or Parylene AF-4 is a transparent polymer in visible wavelength, and may advantageously be used also as hydrophobic layer coated on the window of an optical electrowetting device, especially an optical lens driven by electrowetting. Considering optical properties of Parylene F or Parylene AF-4 (or Parylene HT™), one important point is that this fluorinated parylene is very stable under UV wavelength light, compare to classical parylenes (such as Parylene N, C and D) which are very sensible to UV wavelength light.

Moreover, Parylene F (or AF-4), as well as Parylene HT™, show high reliable dielectric properties in time and at high temperature (85° C.) in contact with both the conductive and non conductive fluids.

Parylene F is also a very low polar polymer with a very low water (moisture) absorption (less to about <0.01%, after 24 h in contact with water at 23° C., according to ASTM D570) and is therefore most advantageously used for applications as dielectric layer in contact with water. Additionally, Parylene F films have shown high resistance to most chemicals, especially to most non conductive fluids (like chlorinated aromatic alkanes and alkenes or more general halogenated aromatic alkanes that can be used in liquid formulation for electrowetting applications).

If need be, the adhesion of Parylene F on the lower plate, or on the substrate, of the electrowetting device may be controlled by an adhesion promoter between the lower plate (or the substrate) and the Parylene F layer. The adhesion promoter can be a fluorinated silane or a non fluorinated silane.

The use of Parylene F allows the formation of a layer having the required dielectric and hydrophobic properties in the same material, for example in a one CVD (chemical vapour deposition) coating step process.

An optical electrowetting device comprising a conductive fluid and a non-conductive fluid, said fluids being non miscible, and an insulating substrate on which both fluids are in contact and form a triple interface, wherein insulating substrate comprises Parylene F (or Parylene AF-4) polymer is new and forms another object of the present invention.

In particular, Parylene F has shown to be a very good solution for low voltage application. Indeed, in the field of electrowetting devices and especially in the field of optical liquid lens controlled by electrowetting phenomena, one important issue is to obtain a device working at the lowest voltage possible.

Further, the dielectric constant of cured films is about 2.2 at 1 kHz which makes Parylene F, a low-k materials with a low dissipation factor (D=0.0002–0.002 at 60 Hz and ~1 kHz) even at low thickness (<1000 nm). This low dissipation factor can be very important for getting a reliable dielectric layer in time, because this low dissipation factor limit the thermal breakdown voltage under an electrical field.

Parylene F is also a very low polar polymer with a very low water absorption (<0.01%), which can be very interesting for application of dielectric layer in contact with water. Low water absorption can limit the water treeing phenomena under electrical field that can be enhanced for low thickness (<1000 nm). The water absorption can also be a route cause for poor dielectric properties reliability. In other words, a low water absorption property can improve the reliability of the dielectric hydrophobic layer compare to other polymers which can absorb more water.

Further, Parylene F is partially fluorinated making its interaction with organic fluids or non fluorinated fluids lower in comparison to other non-fluorinated polymers. This improves the reliability of that dielectric hydrophobic layer compare to other non fluorinated polymers. This makes Parylene F highly resistant to most non fluorinated fluids and this makes Parylene F usable as an insulating hydrophobic layer resistant to most non polar liquid (e.g. chlorinated aromatic alkanes and alkenes or more general halogenated aromatic alkanes that can be used in liquid formulations for electrowetting applications). Moreover, since Parylene F is partially fluorinated, the reliability of the low polar surface energy material property in contact with the liquid (polar and non polar liquids) is improved, as compared to other hydrophobic polymers.

Figure 6:
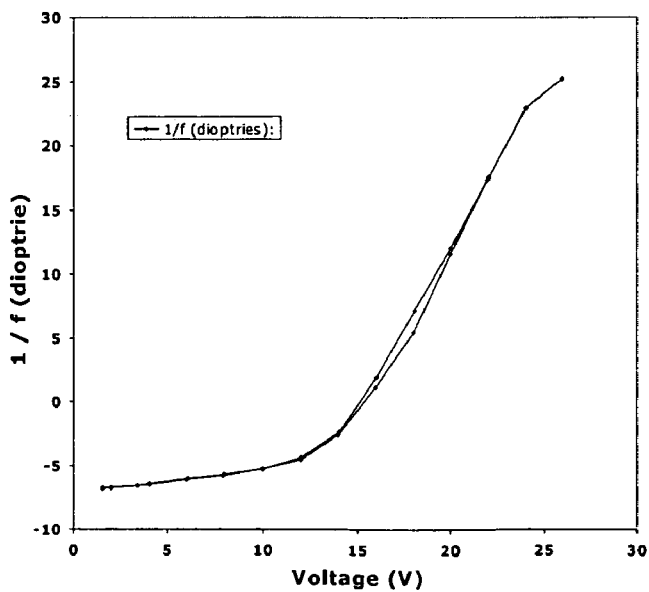
FIG. 6 shows one example of the optical power of a liquid lens, operated at around 20 V, and comprising Parylene F as dielectric hydrophobic layer with a thickness of about 700 nm. The fluids used in this particular example are an oil phase and a conducting phase whose formulations are given below (all % are weight %)

FIG. 6 shows one example of the optical power of a liquid lens made with a Parylene F layer, that works at around 20 V. Applicants have shown that using Parylene F, optical liquid lenses can be operated at a voltage as low as 10 V or even below 10 V, depending on the interfacial tension of the liquid formulation.

As already mentioned, Parylene VT-4 is a poly(tetrafluoro-para-xylylene), and is disclosed, for example, by J. J. Senkevich et al, *Polymer,* 41, (2000), 2379-2390. Parylene VT-4 may be represented by the following formula:

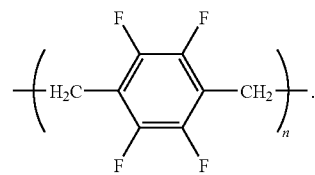

According to another embodiment, the insulating substrate is made of, or comprises an upper layer which is made of, aromatic vinylsiloxane polymer, such as for example divinyl-siloxane-benzocyclobutene polymer, also known as DVS-BCB or Cyclotene®, commercialized by Dow Chemical, the monomer of which is of formula:

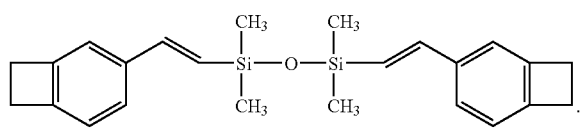

DVS-BCB is a polymer having a surface energy of about 36 mN/m, a low surface polarity and is also a transparent polymer in visible wavelength.

DVS-BCB is a very low polar resin, additionally presenting a very low moisture absorption (<0.23%, after 24 h in contact with water at 23° C., according to ASTM D570).

Relative dielectric constant $\in_r$ of cured films of DVS-BCB polymer is about 2.6 to about 2.7 at 1 MHz which makes DVS-BCB polymer a low-k material (i.e. material with low relative dielectric constant $\in_r$ also named "k"), with a low dissipation factor (D=0.0008 at 1 GHz and 0.002 at 20 GHz). Full cured DVS-BCB polymer films are highly resistant to most chemicals which make them difficult to remove. DVS-BCB polymer is an insulating hydrophobic layer resistant to most non conductive fluids, like chlorinated aromatic alkanes and alkenes or more general halogenated aromatic alkanes that can be used in liquid formulation for electrowetting applications.

Moreover, DVS-BCB polymer shows high reliability dielectric properties in time and at high temperature (85° C.) in contact with both the conductive and non conductive fluids.

If need be, the adhesion of DVS-BCB polymer on the lower plate, or on the substrate, of the electrowetting device may be controlled by an adhesion promoter between the lower plate (or the substrate) and the DVS-BCB polymer layer. The adhesion promoter is, for example, hydrolysed vinyl triacetoxy silane (~0.3 weight %) in 1-methoxy-2-propanol (propylene glycol methyl ether), known as AP 3000® (from Dow Chemicals).

The use of DVS-BCB polymer allows the formation of a layer having the required dielectric and hydrophobic properties in the same material, for example in a one spin coating step process.

An optical electrowetting device comprising a conductive fluid and a non-conductive fluid, said fluids being non miscible, and an insulating substrate on which both fluids are in contact and form a triple interface, wherein insulating substrate comprises DVS-BCB polymer is new and forms another object of the present invention.

According to a further embodiment, the insulating substrate is made of, or comprises an upper layer which is made of, a cyclic perfluoropolymer. Example of such cyclic perfluoropolymer is Cytop® (Cyclic Transparency Optical Polymer), which is obtained by cyclopolymerization of perfluoro (alkenyl vinyl ether) and is commercialized by Asahi Glass. Cytop® is of formula:

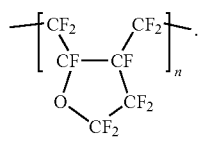

Cytop® is an amorphous fluoropolymer, which amorphous state provides an extremely transparency of over 95%. Cytop® has a low refractive index ($n_d$=1.34) and a low optical dispersion (Abbe's number: 90).

Cytop® also possesses a low relative dielectric constant $\in_r$ of about 2.1, with a volume resistivity over $10^{17}$ Ω·cm, which makes it a good insulating material for electrowetting applications.

As amorphous fluoropolymer, Cytop® is soluble in most fluorinated solvents, and may be applied by spin coating or dip coating in thin films until a thickness of about 0.1 μm.

Moreover Cytop® has excellent properties in terms of heat durability, chemical durability, substantially no water absorption, extremely low relative dielectric constant $\in_r$ of about 2.1 to 2.2 (from 60 Hz to 1 MHz) and very low dissipation factor D of about 0.0007, as well as a surface energy of about 19 mN/m with low polarity.

Cytop® material can be used by mixing this different grade or by using specific grade for tuning adhesion and for optimizing adhesion on this substrate.

If need be, the adhesion of Cytop® on the lower plate, or on the substrate, of the optical electrowetting device may be controlled by an adhesion promoter between the lower plate (or the substrate) and the Cytop® layer, or by mixing different grades or by using specific grade(s) of Cytop® for tuning adhesion and for optimizing adhesion on the substrate.

The use of Cytop® allows the formation of a layer having the required dielectric and hydrophobic properties in the same material, for example in a one spin coating step process. An optical electrowetting device comprising a conductive fluid and a non-conductive fluid, said fluids being non miscible, and an insulating substrate on which both fluids are in contact and form a triple interface, wherein insulating substrate comprises a perfluoro polymer obtained by cyclopolymerization of perfluoro(alkenyl vinyl ether) polymer is new and forms another object of the present invention.

The Non-Conductive Fluid:

According to another feature, the non-conductive fluid comprises an organic or an inorganic (mineral) compound or mixture thereof. Examples of such organic or inorganic compounds include a Si-based monomer or oligomer, a Ge-based monomer or oligomer, a Si—Ge-based monomer or oligomer, a hydrocarbon, or a mixture thereof.

The hydrocarbon may be linear or branched and may contain one or more saturated, unsaturated or partially unsaturated cyclic moiety(ies). The hydrocarbon has advantageously from about 10 to about 35 carbon atoms, preferably from about 15 to about 35 carbon atoms. Hydrocarbons having less than about 10 carbon atoms are less preferred since miscibility into the conductive fluid may occur.

The hydrocarbon may comprise one or more insaturation(s) in the form of double and/or triple bond(s). More than 2 or 3 double or triple bonds are not preferred considering the risk of decomposition with UV radiations. Preferably the hydrocarbon does not contain any double or triple bonds, in which case the hydrocarbons are referred to as alkanes in the present specification.

The hydrocarbon may further comprise one or more heteroatoms, as substituants and/or as atoms or group of atoms interrupting the hydrocarbon chain and/or ring. Such heteroatoms include, but are not limited to, oxygen, sulphur, nitrogen, phosphor, halogens (mainly as fluorine, chlorine, bromine and/or iodine). Care should be taken that the presence of one or more heteroatom(s) does not impact the immiscibility of the two fluids.

May be used mixtures containing more than about 99.8% of alkanes. These mixtures may contain little amount of aromatic groups and/or unsaturated moieties in a ratio lower than about 1 weight % (preferentially lower than about 0.5%).

Chlorine may also be present in said alkane, in a ratio lower than about 10 weight %, preferentially lower than about 7%. Such impurities may be present as sub-product resulting from the preparation of the alkanes, e.g. when they are obtained by distillation process.

According to various features of the present invention, the hydrocarbon is or comprises:

- a linear or branched alkane, such as decane ($C_{10}H_{22}$), dodecane ($C_{12}H_{24}$), squalane ($C_{30}H_{62}$), and the like;
- an alkane comprising one or more rings, such as tert-butylcyclohexane ($C_{10}H_{20}$), and the like;
- a fused ring system, such as α-chloronaphthalene, α-bromonaphthalene, cis,trans-decahydronaphthalene ($C_{10}H_{18}$), and the like;
- a mixture of hydrocarbons, such as those available as Isopar® V, Isopar® P (from ExxonMobil); and the like;

In the present application, an oligomer is a compound having a number of identical (homo-oligomers) or different (co-oligomers) repeating units, of between about 2 and about 20, preferably between about 2 and about 10, and still more preferably between about 2 and about 5. Oligomers having more than 20 repeating units are less preferred since they may induce an undesirable increase of viscosity at low temperature.

The non-conductive fluid may contain one or several of the following Si-based species:

a siloxane of the formula 1a, 1b or 1c:

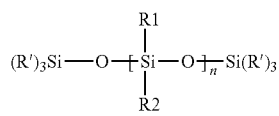

1a

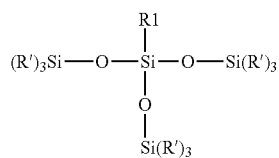

1b

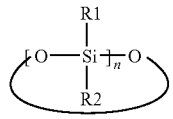

1c wherein each of R1, R2 and R' independently represents alkyl, (hetero)aryl, (hetero)arylalkyl, (hetero)arylalkenyl or (hetero)arylalkynyl and n is comprised between about 1 and about 20, preferably between about 1 and about 10, more preferably n is 1, 2, 3, 4 or 5 with the precision that n is greater than 2 in formula 1c;

a silane of formula 2:

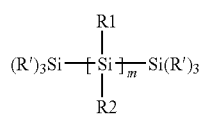

2 wherein R1, R2 and R' are as defined above and m is comprised between 1 and 20, preferably between about 1 and about 10, more preferably m is 1, 2 or 3;

a monosilane of formula 3:

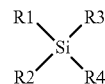

3 wherein R1 and R2 are as defined above, and each of R3 and R4 independently represents alkyl, (hetero)aryl, (hetero)arylalkyl, (hetero)arylalkenyl or (hetero)arylalkynyl.

In the above formulae:

- alkyl means a straight or branched alkyl radical having from about 1 to about 10 carbon atoms, preferably from about 1 to about 6 carbon atoms; preferred alkyl includes methyl, ethyl, n-propyl, iso-propyl; alkyl radical may be halogenated, for instance may comprise a 1,1,1-trifluoropropyl group;
- (hetero)aryl means an aromatic or heteroaromatic radical containing from about 5 to about 12 atoms, forming at least one, preferably one, aromatic and/or heteroaromatic ring, said ring(s) being optionally substituted by one or more halogens, preferably 1, 2 or 3 halogen atoms (mainly fluorine, chlorine and/or bromine), and being optionally fused with one or more saturated, partially saturated or unsaturated ring system; preferred (hetero)aryl is phenyl or naphthyl, optionally substituted with 1, 2 or 3 halogen atoms;
- (hetero)arylalkyl is as defined above for the alkyl and (hetero)aryl radicals; preferred (hetero)arylalkyls include benzyl, phenethyl, optionally substituted with 1, 2 or 3 halogen atoms;
- (hetero)arylalkenyl and (hetero)arylalkynyl correspond to radicals wherein the (hetero)aryl moiety is as defined above, and alkenyl and alkynyl represent a straight or branched alkyl radical, as defined above, further comprising one or more, preferably one, double bond or one or more, preferably one, triple bond, respectively.

According to a preferred embodiment, in the above formulae 1a, 1b and 2, all R' are identical or different and are preferably methyl or halogenated alkyls.

According to a further preferred embodiment, in the above formulae 1a, 1b and 2, all R' are the same, more preferably each R' is methyl.

The non-conductive fluid may contain one or several of the following specific Si-based species:

hexamethyldisilane, diphenyldimethylsilane, chlorophenyltrimethylsilane, phenyltrimethylsilane, phenethyltris(trimethylsiloxy)silane, phenyltris(trimethylsiloxy)silane, polydimethylsiloxane, tetraphenyltetramethyltrisiloxane, poly(3,3,3-trifluoropropylmethylsiloxane), 3,5,7-triphenylnonamethylpentasiloxane, 3,5-diphenyloctamethyltetrasiloxane, 1,1,5,5-tetraphenyl-1,3,3,5-tetramethyltrisiloxane, and hexamethylcyclotrisiloxane.

The non-conductive fluid may contain one or several of the following germane based species:

germanoxane of formula 4 germane of formula 5 germane of formula 6

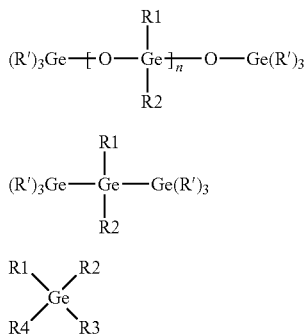

wherein R', R1, R2, R3, R4 and n are as defined above.

The non-conductive fluid may contain one or several of the following specific germane based species: hexamethyldigermane, diphenyldimethylgermane, phenyltrimethyl-germane.

According to another feature, the non-conductive fluid comprises at least one Si- and/or Ge-based compound substituted by one or more phenyl groups and/or other groups like fluorinated or non fluorinated alkyl (ethyl, n-propyl, n-butyl), linear or branched alkyls, chlorinated or brominated phenyl groups, benzyl groups, halogenated benzyl groups; or a mixture of Si- and/or Ge-based compounds wherein at least one compound is substituted by one or more phenyl groups and/or other groups like fluorinated or non fluorinated alkyl (ethyl, n-propyl, n-butyl), linear or branched alkyls, chlorinated or brominated phenyl groups, benzyl groups, halogenated benzyl groups.

In a preferred embodiment, when the non-conductive fluid comprises a siloxane compound, especially an aryl siloxane compound, said compound is such that the ratio of the total number of aryl, e.g. phenyl, radicals or groups to the total number of Si atoms is equal to or less than about 1.33, preferably equal to or less than 1, and more preferably equal to or less than about 0.8.

Si-based compounds containing a ratio of aryl, e.g. phenyl, radicals or groups to Si atoms greater than about 1.33 can become hazy after thermal stress when they are in the presence of the aqueous conductive fluid. Turbidity value for such oils is usually higher than about 1000 NTU. Using selected SI-based compounds, such as siloxanes or silanes, advantageously aryl siloxanes, wherein the ratio of the total number of aryl groups, e.g. phenyl radicals or groups, to the total number of Si atoms is equal to or less than about 1.33, preferably, less than about 1, and more preferably less than about 0.8, leads to a decrease of turbidity to less than about 200 NTU, which is an acceptable value for use in optical electrowetting devices, such as optical lenses.

According to another feature of the present invention, the non-conductive fluid comprises a wetting agent to increase the wettability of said fluid on the insulating substrate of the optical electrowetting device. The nature of the wetting agent will depend on the nature of the surface of said insulating substrate.

Still according to another feature, the organic or inorganic (mineral) compound or mixture thereof that is the primary component of the non-conductive fluid may itself have wetting properties with respect to the substrate or the coating, as is for example the case with aryl mono germane compounds as described above, or may comprise a component that presents this property. The organic or inorganic (mineral) compound may thus itself be the wetting agent when a specific substrate or coating is used.

Examples of organic or inorganic (mineral) compounds-and/or of wetting agents on Parylene or Cyclotene® or other non-conductive material having a high surface energy (>30 mN/m)—are listed in below Tables 1, 2 and 3 (CF refers to "conductive fluid"):

TABLE 1

| | Density at 20° C. (g/cm3) | Refractive index at 589.3 nm at 20° C. | Viscosity at 20° C. (cSt) | Surface tension mN/m at 20° C. | Contact angle on Parylene C in CF1* (±1) |
|---|---|---|---|---|---|
| 1-Bromononane | 1.0895 | 1.4545 | 1.9 | 28.69 | 5 |
| 1,2-Dibromohexane | 1.5812 | 1.5026 | 1.7 | 30.52 | 5 |
| Bromocyclohexane | 1.3347 | 1.4954 | 1.8 | 31.57 | 13 |
| 1-Chloro-2-methyl-2-phenylpropane | 1.0423 | 1.5244 | 3.3 | 34.36 | 8 |
| 1,9-Dichlorononane | 1.0102 | 1.4599 | 3.9 | 34.49 | 7 |
| 1,8-Dichlorooctane | 1.0261 | 1.4592 | 3.2 | 34.52 | 0 |
| 1,10-Dichlorodecane | 0.9966 | 1.4609 | 4.8 | 34.54 | 15 |
| Cycloheptylbromide | 1.3085 | 1.5045 | 2.4 | 35.05 | 12 |
| 1-Chloro-3-phenylpropane | 1.0478 | 1.5222 | 2.4 | 35.94 | 8 |
| 2-Phenylethylbromide | 1.37 | 1.5573 | 2.3 | 37.69 | 0 |
| 1,8-Dibromooctane | 1.4657 | 1.4993 | 4.1 | 37.73 | 0 |
| 1-Bromo-3-phenylpropane | 1.3127 | 1.545 | 2.7 | 37.92 | 3 |
| 1,6-Dibromohexane | 1.608 | 1.5073 | 2.7 | 38.39 | 0 |
| 1,9-Dibromononane | 1.4115 | 1.4964 | 4.9 | 39 | 0 |
| 1,1,2-Tribromoethane | 2.61 | 1.593 | 1.6 | 43.16 | 0 |

*CF1 is Conductive Fluid 1 as defined in Table 6

TABLE 2

| | Density at 20° C. (g/cm3) | Refractive index at 589.3 nm at 20° C. | Viscosity at 20° C. (cSt) | Surface tension at 20° C. | Contact angle on Parylene C in CF1 (±1) |
|---|---|---|---|---|---|
| Cyclohexylbenzene | 0.9424 | 1.5258 | 3.0 | 30.62 | 17 |
| 1,2-Dichlorobenzene | 1.3061 | 1.5514 | 1.1 | 31.56 | 7 |
| 1-Chloro-2-fluorobenzene | 1.2405 | 1.5010 | 0.8 | 31.82 | 3 |
| 2-Chloro-1,4-dimethylbenzene | 1.056 | 1.5235 | 1.0 | 31.9 | 0 |
| Chlorobenzene | 1.1066 | 1.5248 | 0.7 | 32.63 | 0 |
| 1-Bromo-4-propylbenzene | 1.286 | 1.5363 | 1.6 | 33.15 | 0 |
| 1-Bromo-4-ethylbenzene | 1.3395 | 1.5446 | 1.1 | 33.65 | 6 |
| Bromobenzene | 1.4964 | 1.5597 | 0.8 | 33.99 | 15 |
| 1-Phenyl-1-cyclohexene | 0.99 | 1.5684 | | 37.25 | 0 |
| Cyclopropyl phenyl sulfide | 1.0619 | 1.5823 | 2.7 | 38.43 | 2 |
| 4-Chlorodiphenyl ether | 1.1916 | 1.5885 | 4.7 | 39.13 | 9 |
| Thioanisole | 1.0584 | 1.5870 | 1.5 | 39.23 | 0 |
| Phenyl sulfide | 1.1123 | 1.6328 | 4.3 | 41.36 | 5 |
| 4-Bromodiphenyl ether | 1.4213 | 1.6082 | 5.9 | 42.12 | 6 |
| 2-Fluorobenzophenone | 1.1853 | 1.5856 | 17.8 | 42.44 | 14 |
| 1-Bromonaphtalene | 1.4889 | 1.6582 | 3.7 | 43.57 | 0 |
| 2-Bromothioanisole | 1.542 | 1.6338 | 3.3 | 44.58 | 12 |

TABLE 3

| | density at 20° C. (g/cm3) | refractive index at 589.3 nm at 20° C. | Contact angle on Parylene in CF1 (±1°) |
|---|---|---|---|
| Diphenyldimethylgermane | 1.18 | 1.573 | 5 |
| Phenyltrimethylgermane | 1.11 | 1.505 | 11 |
| Diphenyldimethylsilane | 0.99 | 1.561 | 4 |

Examples of organic or inorganic (mineral) compounds- and/or of wetting agents on Teflon® AF or Cytop® or other material having a low surface energy (<30 mN/m) are listed in the Tables 4 and 5 below:

TABLE 4

| | Siloxanes | | | | |
|---|---|---|---|---|---|
| | Density at 20° C. (g/cm3) | Refractive index at 589.3 nm at 20° C. | Viscosity at 20° C. (cSt) | Surface tension mN/m at 20° C. | Contact angle on Teflon in CF1 (±1°) |
| 3,5-Diphenyloctamethyl-tetrasiloxane | 0.9759 | 1.4772 | 6.7 | 23.92 | 0 |
| Baysilone M 5 (Bayer) | 0.9162 | 1.3982 | 5.4 | 18.41 | 8.9 |
| Baysilone PK 20 (Bayer) | 0.9822 | 1.4609 | 21.5 | 22.05 | 10.6 |
| Siloxane DC200/0.65 (Dow Corning) | 0.7634 | 1.3772 | 0.6 | 15.57 | 0 |
| Siloxane DC200/10 (Dow Corning) | 0.9392 | 1.4010 | 10.7 | 18.38 | 6 |
| Siloxane DC200/5 (Dow Corning) | 0.9168 | 1.3980 | 5.6 | 18.61 | 7.2 |
| Siloxane DC702 (Dow Corning) | 1.0916 | 1.5181 | 62.2 | 28.45 | 15.3 |
| Siloxane DC FS1265 (Dow Corning) | 1.2509 | 1.3814 | 410.3 | 21.56 | 18.4 |
| DES T11 (ABCR) | 0.9468 | 1.433 | 6.3 | 23.85 | 0 |
| DMS-T02 (ABCR) | 0.8978 | 1.3955 | 3.3 | 18.2 | 9.8 |
| Hexamethyldisilane | 0.71 | 1.4226 | | 20.56 | 0 |
| PMM-0011 (ABCR) | 0.979 | 1.4806 | 6.5 | 23.32 | 0 |
| poly(dimethylsiloxane-co-diphenylsiloxane), 550 | 1.0643 | 1.4977 | 148.8 | 24.73 | 10.3 |
| poly(dimethylsiloxane-co-diphenylsiloxane), dihydroxy terminated | 1.0477 | 1.4717 | 71.3 | 21.89 | 6.7 |
| Rhodorsil 47V10 (Rhodia) | 0.9376 | 1.4007 | 10.6 | 19.16 | 10.2 |

TABLE 4-continued

| | Siloxanes | | | | |
|---|---|---|---|---|---|
| | Density at 20° C. (g/cm3) | Refractive index at 589.3 nm at 20° C. | Viscosity at 20° C. (cSt) | Surface tension mN/m at 20° C. | Contact angle on Teflon in CF1 (±1°) |
| Rhodorsil 550 (Rhodia) | 1.068 | 1.5008 | 192.5 | 21.32 | 12.1 |
| Rhodorsil 604V50 (Rhodia) | 0.9623 | 1.4039 | 53.5 | 20.13 | 7.2 |
| SIB 1816.0 (ABCR) | 1.4772 | 1.3383 | 9.7 | 18.73 | 6.9 |
| FMS 121 | 1.224 | 1.381 | 125.6 | 21.73 | 11.7 |

TABLE 5

| | Others | | | | |
|---|---|---|---|---|---|
| | density at 20° C. (g/cm3) | refractive index at 589.3 nm at 20° C. | viscosity at 20° C. (cSt) | Surface tension mN/m at 20° C. | Contact angle on Teflon ® in CF1 (±1) |
| 1,3,5-Triisopropylbenzene | 0.84 | 1.4886 | 4.9 | 26.87 | 0 |
| 1,3-Diisopropylbenzene | 0.8559 | 1.4887 | 1.7 | 27.28 | 0 |
| 1-Bromo-2,5-difluorobenzene | 1.708 | 1.509 | | 25.75 | 2 |
| 1-Bromo-4-butylbenzene | 1.2399 | 1.5301 | 2.0 | 23.59 | 19 |
| 1-Bromododecane | 1.0355 | 1.4580 | 3.8 | 27.65 | 0 |
| 1-Chlorooctane | 0.873 | 1.4303 | 1.4 | 26.74 | 16 |
| 1-Chlorotetradecane | 0.8652 | 1.4468 | 5.1 | 29.62 | 0 |
| 2-Bromododecane | 1.02 | 1.4576 | | 25.28 | 0 |
| cis, trans-Decahydronaphthalene | 0.881 | 1.474 | 2.9 | 28.54 | 0 |
| Cyclohexane | 0.7786 | 1.4261 | 1.2 | 25 | 15 |
| Dodecane | 0.753 | 1.4218 | | 24.53 | 0 |
| Heptane | 0.684 | 1.3876 | 0.5 | 20.27 | 0 |
| Hexane | 0.6597 | 1.3748 | 0.3 | 18.05 | 0 |
| Isopar P | 0.8001 | 1.4442 | 4.2 | 25.24 | 0 |
| Nonane | 0.7178 | 1.4054 | 0.9 | 22.5 | 8 |
| Octane | 0.7029 | 1.3974 | 0.7 | 21.39 | 0 |
| o-Xylene | 0.88 | 1.5048 | 0.9 | 26.94 | 8 |
| p-Xylene | 0.8611 | 1.4958 | 0.7 | 27.6 | 14 |
| Undecane | 0.7406 | 1.4171 | 1.5 | 23.93 | 0 |
| 1,1,1,5,5,5-Hexafluoroacetylacetone | 1.47 | 1.3342 | | 14.74 | 0 |
| Bromopentafluorobenzene | 1.9442 | 1.4493 | 0.8 | 25.53 | 0 |
| Fluorinated HFE 7200 (3M) | 1.4338 | | 0.5 | 14.38 | 0 |
| FC-40 (3M) | 1.8839 | | 2.9 | 16.38 | 7 |
| FC-75 (3M) | 1.7735 | | 0.9 | 14.35 | 0 |
| Perfluoropolyether Galden HT230 (Solvaysolexis) | 1.8295 | | 5.8 | 15.49 | 0 |
| Perfluoropolyether Galden HT270 (Solvaysolexis) | 1.8612 | | 17.5 | 16.43 | 11 |
| 1-Fluorooctane | 0.8123 | 1.3959 | 0.7 | 23.77 | 0 |

The wetting agent may be a monohalogenated aromatic compound, a α,ω-dihalogenated alkyl compound or a mixture thereof. In a preferred embodiment, the non-conductive fluid comprises 1-bromo-4-ethylbenzene, α,ω-dichlorooctane or a mixture thereof as a wetting agent.

Among the wetting agents on Parylene C, or other material having a high surface energy (>30 mN/m), those of formula (I) or of formula (II) or a mixture thereof are preferred:

$$X^1-A-X^2; \quad (I)$$

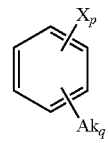

(II)

wherein:

X, $X^1$ and $X^2$ are halogen atoms (mainly fluorine, chlorine and/or bromine);

A is linear or branched ($C_4$-$C_{20}$)alkylene, optionally substituted by halogen atom(s), and optionally comprising one or more, preferably one, double bond, and/or one or more, preferably one, triple bond;

Ak is $C_1$-$C_{10}$ alkyl, preferably $C_1$-$C_6$ alkyl, such as methyl, ethyl, propyl, and linear or branched butyls, pentyls and hexyls;

p and q are each chosen from 1, 2, 3, 4 or 5, provided that p+q is 2, 3, 4, 5 or 6.

Preferably, X, $X^1$ and $X^2$ are independently Cl or Br. Ak preferably represents ethyl.

Examples of formula (I) include the compounds listed in Table 1. Examples of formula (II) include the compounds listed in Table 2.

Compounds of formula (I) and of formula (II) show a good resistance to hydrolysis when in contact with an aqueous conductive fluid, and are particularly suitable wetting agents.

In a preferred embodiment, the non-conductive fluid comprises α,ω-dichlorooctane as hydrolysis-resistant wetting agent.

In another preferred embodiment, the non-conductive fluid comprises 1-bromo-4-ethylbenzene as hydrolysis-resistant wetting agent.

The presence of halogenated groups in the non conductive fluid may help to decrease the natural contact angle. The one skilled in the art will find in the above-described components of the non-conductive fluid, a number of halogenated species and these species could be used by the one skilled in the art in the non-conductive fluid in order to adjust the natural contact angle in accordance with the invention.

In another preferred embodiment, the non-conductive fluid comprises a biocide compound, which may be the same as, or different from, the biocide optionally present in the conductive fluid.

In another preferred embodiment, the non-conductive fluid comprises an antioxidant. It has been observed in an optical electrowetting device that adding an antioxidant in the non conductive fluid could prevent degradation of the hydrophobic coating properties under UV irradiation during a sun-test. This particular effect stabilizes the device hysteresis and thus increases the device reliability. In addition, this protection over UV irradiation renders unnecessary the implementation of a UV filter on the device, lowers the manufacturing cost and simplifies the assembling process.

In another preferred embodiment, the non-conductive fluid comprises butylated hydroxytoluene (BHT) as an antioxidant.

Among the wetting agents on Teflon® AF or Cytop® or other material having a low surface energy (<30 mN/m) those of formula (III) or of formula (IV) or a mixture thereof are appropriate embodiments:

Siloxane having a ratio of phenyl groups to silicon atoms below 1;    (III)

$X^3$-$A_n$.    (IV)

wherein $X^3$ is a halogenated atom (preferably fluorine, chlorine or bromine) or a hydrogen; and $A_n$ is a hydrocarbon or a fluorinated hydrocarbon of n carbon atoms, n being an integer of from about 6 to about 12.

Anti-oxidant compounds include those known by the one skilled in the art, and, for example, are of the BHT-type (butylated hydroxytoluene) anti-oxidants, such as 2,6-di-tert-butyl-4-methylphenol.

The Conductive Fluid:

According to another feature, the electrical conductive fluid comprises water and at least one organic or inorganic ion, typically at least one organic or inorganic ionic or ionizable salt, or a mixture thereof, conferring conductive properties to said fluid.

In the following specification, "ionic salts" refers to salts that are totally or substantially totally dissociated (such as a bromine-anion and a cation) in water. "Ionizable salts" refers to salts that are totally or substantially totally dissociated in water, after chemical, physical or physico-chemical treatment.

Ions that are suitable in the present invention include both cations and anions, which may be simultaneously, but not necessarily, present together in the conductive fluid.

depending on voltage ramp direction. Hysteresis in focal is around 2.5 $m^{-1}$, representing a 10 V voltage hysteresis.

The natural contact angle $\theta_n$ in this lens was above 20°.

More generally, in any optical application using electrowetting, such a hysteresis implies that the device has two characteristics for the same input command, drastically complicating the entire driving process. Reducing hysteresis is consequently a way to facilitate the driving process of the device as well as an improvement of the liquid lenses optical quality.

Figure 4:
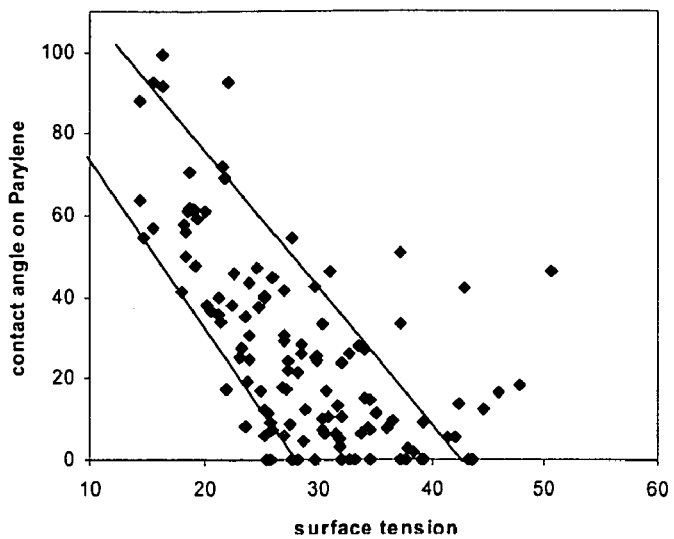
FIG. 4 is a graph showing the contact angle of numerous non conductive fluids on Parylene C, depending on the surface tension, in presence of a conductive fluid having a surface tension $y_L$ of 44±1 mN/m.

On FIG. 4, numerous non-conductive fluids have been deposited on a Parylene C coating in presence of a conductive fluid having a surface tension of 44±1 mN/m. Natural contact angles have been measured and plotted depending on the non-conductive fluid surface tension. It is noticeable that non-conductive fluids having a surface tension above 28 mN/m present a low natural contact angle, in accordance with the present invention.

Figure 5:
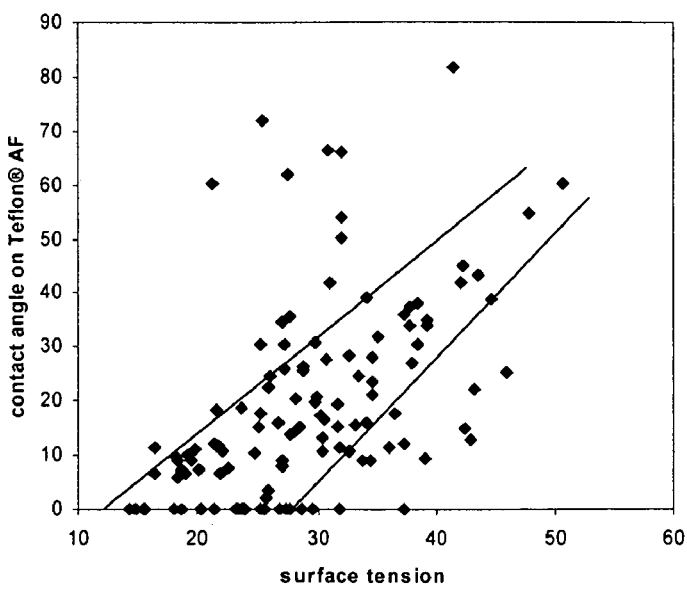
FIG. 5 is a graph showing the contact angle of numerous non conductive fluids on Teflon® AF depending on the surface tension, in presence of a conductive fluid having a surface tension $y_L$ of 44±1 mN/m.

Similarly, on FIG. 5 the same non-conductive fluids have been deposited on a Teflon® AF 1601 coating in presence of a conductive fluid having a surface tension of 44±1 mN/m. Natural contact angles have been measured and plotted depending on the non-conductive fluid surface tension. It is noticeable that non-conductive fluids having a surface tension below about 28 mN/m present a low natural contact angle, in accordance with the present invention.

On FIG. 7, natural contact angles have been measured on various coatings using a non conductive fluid NCF1 having a surface tension of 25 mN/m surrounded by a conductive fluid CF1 having a surface tension of 44 mN/m. Compositions of CF1 and NCF1 are presented in Table 6 below and their physico-optical characteristics in Table 7 that follows:

TABLE 6 conductive fluid CF1 and non-conductive fluid NCF1

| Conductive fluid CF1 | | Non-conductive fluid NCF1 | |
| --- | --- | --- | --- |
| Compound | weight % | Compound | weight % |
| Water | 33.77 | SIP 6827.0 | 35 |
| $Na_2SO_4$ | 0.2 | DC 704 | 25.1 |
| 1,2-Propane diol | 43.8 | DC 702 | 15 |
| 1,2,3-Propane triol | 22.2 | DC 705 | 5 |
| Acticide molecule (RS from Thor) | 0.03 | 1,6-dibromohexane | 19.9 |

Examples of anions include, but are not limited to, halides, e.g. chloride, bromide, iodide, sulphate, carbonate, hydrogen carbonate, acetate, and the like, as well as mixtures thereof. Examples of cations include, but are not limited to, alkali, alkaline-earth and metallic cations. Organic and inorganic ionic and ionizable salts are thus well known in the art, and examples of these include, but are not limited to potassium acetate, magnesium chloride, zinc bromide, lithium bromide, sodium bromide, lithium chloride, calcium chloride, sodium sulphate, and the like, as well as mixtures thereof.

Mixtures of one or more ionic salts together with one or more ionizable salts are also encompassed by the present invention.

According to a particularly preferred embodiment of the present invention, the salt present in the conductive fluid is sodium sulphate, potassium acetate, zinc bromide, sodium bromide, or lithium bromide, and mixtures thereof, and more preferably, sodium sulphate, potassium acetate, or lithium bromide, and mixtures thereof.

As already mentioned, the conductive fluid comprises an organic or inorganic ionic or ionizable salt. Said salt is dissolved in water.

Water to be used in the conductive fluid should be as pure as possible, i.e. free, or substantially free, of any other dissolved components that could alter the optical properties of the optical electrowetting device, namely an optical lens driven by electrowetting. Ultra pure water is most preferably used.

The concentration of the dissolved salt in the conductive fluid may vary in large proportions, keeping in mind a too high concentration may result in undesirable increase of density, refractive index, turbidity, haze, or loss of transparency for the optical device, lens or else.

According to another feature, the electrical conductive fluid comprises at least one conventional freezing-point lowering agent. As freezing-point lowering agent, mention may be made of alcohol, glycol, glycol ether, polyol, polyetherpolyol and the like, or mixtures thereof. Examples thereof include the following agents: ethanol, ethylene glycol, monopropylene glycol (MPG or 1,2-propane diol), 1,3-propane diol, 1,2,3-propane triol (glycerol), and the like, and mixtures thereof.

According to still another feature, the conductive fluid comprises at least one viscosity-controlling agent. The viscosity-controlling agent that may be used in the invention may be of any type known from the one skilled in the art and may be advantageously an alcohol, a glycol, a glycol ether, a polyol, a poly ether polyol and the like, or mixtures thereof. Examples thereof include the following agents: ethanol, ethylene glycol, monopropylene glycol (MPG), 1,2,3-propane triol (glycerol), and the like, and mixtures thereof.

In a preferred embodiment, the viscosity-controlling agent has a molecular weight of less than about 130 g/mol.

The viscosity-controlling agent may be the same or different from the freezing-point lowering agent. According to a feature, the conductive fluid comprises an agent that is both a freezing-point lowering agent and a viscosity-controlling agent.

According to still another feature, the conductive fluid advantageously comprises a biocide agent in order to prevent the development of organic elements, such as bacteria, fungi, algae, micro-algae, and the like, which could worsen the optical properties of the optical electrowetting device, particularly in the case of a lens driven by electrowetting. Such biocide agent may be of any type known in the art, provided, as is the case for the freezing-point lowering agent and the viscosity-controlling agent, that it does not alter the required optical properties of the conductive fluid (transparency, refractive index, and the like, as mentioned above). Biocide compounds include those usually known and used in the art, and for example 2-methyl-4-isothiazoline-3-one (MIT), 1,2-benzisothiozoline-3-one (BIT), bacticide.

A conventional anti-UV agent may also be present in the conductive fluid, in the non-conductive fluid or in both fluids.

According to an embodiment, a multi-phase composition containing the non-conductive and the conductive fluids has a mean arithmetic cinematic viscosity of between about 1.5 cSt and about 40 cSt, preferably of between about 1.5 cSt and about 20 cSt, more preferably of between about 3 cSt and about 10 cSt, within a temperature range of about $-10°$ C. to about $+60°$ C., preferably of about $-20°$ C. to about $+60°$ C., more preferably of about $-20°$ C. to about $+70°$ C.

In the present application, the cinematic viscosity is measured following ASTM D7042-04. The resistance of the liquid between a rotor and a stator is determined at the determined temperature, e.g. at $-10°$ C., $-20°$ C., $+60°$ C. or $+70°$ C. and/or at intermediate values within the range of temperature comprised between $-10°$ C., $-20°$ C. and $+60°$ C. or $+70°$ C. A viscometer of the type of Anton Paar SVM 3000 may be used, and reference is made to EP-B1-0 926 481. The content of these documents is hereby incorporated herein by reference. The mean arithmetic cinematic viscosity is the mathematic mean of the cinematic viscosities measured separately for the conductive and non-conductive fluids using the above method.

According to another feature, the difference of viscosity between the conductive fluid and the non-conductive fluid is comprised between 0 cSt and about $\pm 10$ cSt, preferentially between 0 cSt and about $\pm 5$ cSt, within a temperature range of about $-10°$ C. to about $+60°$ C., preferably of about $-20°$ C. to about $+60°$ C., more preferably of about $-20°$ C. to about $+70°$ C.

According to another feature, the non-conductive fluid and the conductive fluid have substantially the same density. This means it is acceptable that the difference of densities may vary within a short range. Typically, it is preferred the difference of densities is not more than about $3.10^{-3}$ g/cm$^3$ at 20° C.

According to another feature, the non-conductive fluid and the conductive fluid are transparent (as defined above) and each have a refractive index different from the other. The difference of refractive index of the two fluids advantageously ranges from about $\pm 0.03$ to about $\pm 0.8$, preferably from about $\pm 0.04$ to about $\pm 0.6$, more preferably from about $\pm 0.06$ to about $\pm 0.3$.

In a preferred embodiment, the refractive index of the non-conductive fluid is greater than the refractive index of the conductive fluid.

According to an embodiment, the optical electrowetting device of the invention comprises an insulating substrate made of, or comprising an upper layer made of, a para-xylylene linear polymer, preferably a parylene, more preferably Parylene C, Parylene D, Parylene N, Parylene F or AF-4, or Parylene VT-4, still more preferably Parylene C, Parylene N or Parylene F, a conductive fluid comprising water and an organic or inorganic salt, and a non-conductive fluid comprising halogenated alkane(s) and/or siloxane oil(s).

Advantageously, the optical electrowetting device of the invention comprises an insulating substrate made of, or comprising an upper layer made of, Parylene C, a conductive fluid comprising water and an inorganic salt, and a non-conductive fluid comprising halogenated alkane(s) and siloxane oil(s).

According to a particularly preferred embodiment, the present invention relates to an optical electrowetting device comprising:

an insulating substrate made of, or comprising an upper layer made of, Parylene C;

a conductive fluid comprising:

i) from about 35 weight % to about 45 weight %, preferably from about 38 weight % to about 42 weight %, more preferably about 40 weight % of water, ii) from about 0.15 weight % to about 0.25 weight %, preferably from about 0.17 weight % to about 0.23 weight %, more preferably about 0.20 weight % of sodium sulphate, iii) from about 55 weight % to about 65 weight %, preferably from about 58 weight % to about 62 weight %, more preferably about 60 weight % of monopropylene glycol (MPG), and iv) optionally a biocide agent, up to about 0.2%; and a non-conductive fluid comprising:

a) from about 15 weight % to about 25 weight %, preferably from about 18 weight % to about 22 weight %, more preferably about 20 weight % of phenyltris (trimethylsiloxy) silane, b) from about 55 weight % to about 65 weight %, preferably from about 58 weight % to about 62 weight %, more preferably about 60 weight %, of a cyclosiloxane and phenylated siloxane mixture having a Ph/Si ratio less than about 1.33 and a Ph/Me ratio less than about 1.33, c) from about 15 weight % to about 25 weight %, preferably from about 18 weight % to about 22 weight %, more preferably about 20 weight %, of 1,8-dichlorooctane, and d) from about 0.4 weight % to about 0.8 weight %, preferably from about 0.5 weight % to about 0.7 weight %, more preferably about 0.6 weight %, of a butylated hydroxyl toluene, preferably 2,6-di-tert-butyl-4-methylphenol.

In another aspect, the invention is related to an apparatus containing an optical electrowetting device according to the invention. In a feature, the apparatus comprises means to apply an A.C. (alternative current) or a D.C. (direct current) voltage, preferably an A.C. voltage to the conductive fluid. A.C. voltage is preferred since a substantial reduction of hysteresis has been observed as compared to the use of a D.C. voltage.

The optical electrowetting device of the invention may be a variable focus liquid lens, an optical diaphragm, an optical zoom.

In still another aspect, the invention is related to a set or to an apparatus comprising an optical electrowetting device according to the invention, and a driver or similar electronic means for controlling the device. In an embodiment, an optical electrowetting device and the driver or similar electronic means are integrated in the apparatus. In another embodiment, the apparatus comprises several (more than one) optical electrowetting device(s) and at least one driver or similar electronic means. According to a feature, the driver comprises means to apply an A.C. or D.C. voltage, preferably an A.C. voltage, to the conductive fluid.

The apparatus may be a camera, a cell phone, an endoscope, a telemeter, a dental video camera.

The present invention will now be described in further details by way of non-limiting examples and by reference to the attached drawings.

FIG. 1 is a simplified cross-section view of a variable-focus liquid lens according to the invention.

Figure 2:
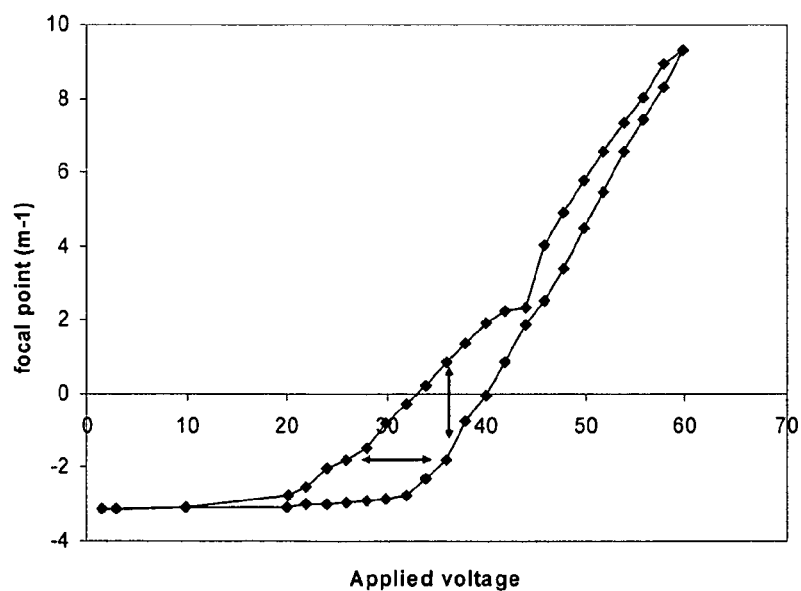
FIG. 2 represents a graph illustrating undesirable focal hysteresis in a liquid lens.

FIG. 2 represents a graph illustrating undesirable focal hysteresis in a liquid lens.

FIG. 3 is a schematic description of the natural angle of a non conductive liquid on a surface in presence of a conductive liquid.

FIG. 4 is a graph showing the contact angle of numerous non conductive fluids on Parylene C, depending on the surface tension, in presence of a conductive fluid having a surface tension $y_L$ of 44±1 mN/m.

FIG. 5 is a graph showing the contact angle of numerous non conductive fluids on Teflon® AF depending on the surface tension, in presence of a conductive fluid having a surface tension $y_L$ of 44±1 mN/m.

FIG. 6 shows one example of the optical power of a liquid lens, operated at around 20 V, and comprising Parylene F as dielectric hydrophobic layer with a thickness of about 700 nm. The fluids used in this particular example are an oil phase and a conducting phase whose formulations are given below (all % are weight %):

| Non-conductive fluid | | Conductive fluid | |
|---|---|---|---|
| T23/SIP 6827 | 20% | Water | 39.7% |
| DC 702 | 59.4% | $Na_2SO_4$ | 0.2% |
| 1,8-dichlorooctane | 20% | Benzalkonium chloride | 0.1% |
| BHT | 0.6% | 1,2-Propanediol | 60% |

FIG. 7 is a graph showing the relation between substrate polarity (mN/m) and contact angle for a non conductive fluid ($y_L$=25±1 mN/m) in presence of a conductive fluid ($y_L$=44±1 mN/m).

FIG. 8 is a graph showing the maximum contact angle hysteresis on Parylene C depending on natural contact angle, measured between the natural contact angle and above 60°.

FIG. 9 is a graph showing an improved focal hysteresis in a liquid lens according to the invention.

Experimental Studies

FIG. 2 shows the experimental measured focal length of a liquid lens as a function of the voltage applied. As it appears from FIG. 2, the focal length of the lens is different

TABLE 7

| | Density at 25° C. | Surface tension (mN/m) | viscosity at 25° C. (cSt) | Refractive index |
|---|---|---|---|---|
| CF1 | 1.0869 | 43.5 | 13.5 | 1.4115 |
| NCF1 | 1.088 | 23 | 9.3 | 1.4985 |

As it appears from FIG. 7, coatings with low surface polarity present the lowest natural contact angles.

On FIG. 8, the maximum contact angle hysteresis has been measured on a 5.0±0.5 μm thick Parylene C substrate using a non-conductive liquid having a surface tension of 25 mN/m surrounded by the conductive fluid CF1 having a surface tension of 44 mN/m, with an applied voltage varying between 0 and 60 V.

Lens focal is given by the relation $1/f=\Delta n/R$ with R the curvature of the radius of the liquid meniscus and $\Delta n$ the refractive index difference between both fluids. Radius R is geometrically related to contact angle through a complex function depending on lens geometry and liquid filling. In the present design, focal is roughly proportional to $1/f=50 \cos \theta$. Taking into account that depth of field for such device is typically 2 $m^{-1}$, hysteresis specification is chosen not to exceed this value, i.e. $\Delta \cos \theta < 0.04$. On this basis, it has been determined that the non-conductive fluid should advantageously spread with a natural contact angle equal or below 20° and preferably equal or below 16°.

The following examples are intended for illustrating purpose only and should not be understood as limiting in any way the scope of the present invention as defined by the present description and claims.

Composition Examples

Multi-Phase Liquid Compositions

All characteristics are measured at 20° C.

All % are by weight. Variations of about ±5% of the amounts expressed in weight % still confer to the disclosed compositions the sought objectives of the present invention.

Composition 1:

| Non-conductive fluid | | Conductive fluid | |
|---|---|---|---|
| Compound | Amount | Compound | Amount |
| T23 | 20% | water | 54.65% |
| DC 702 | 54.4% | $Na_2SO_4$ | 0.2% |
| 1,8-dichlorooctane | 25% | MPG | 45% |
| BHT | 0.6% | Acticide ® MBS | 0.15% | d ($g/cm^3$): 1.0386  d ($g/cm^3$): 1.0369
n: 1.4860  n: 1.3840
Δd ($g/cm^3$): 0.0017
Δn: 0.102
Average viscosity (cSt): 7.5

Composition 2:

| Non-conductive fluid | | Conductive fluid | |
|---|---|---|---|
| Compound | Amount | Compound | Amount |
| SIP 6827 | 20% | water | 39.65% |
| DC702 | 59.4% | $Na_2SO_4$ | 0.2% |
| 1,8-dichlorooctane | 20% | MPG | 60% |
| BHT | 0.6% | Acticide ® MBS | 0.15% | d ($g/cm^3$): 1.0416  d ($g/cm^3$): 1.0439
n: 1.0489  n: 1.3995
Δd ($g/cm^3$): 0.0023
Δn: 0.0895
Average viscosity (cSt): 10.3
Contact angle $\theta_n$ (°) on Parylene C: 14

Composition 3:

| Non-conductive fluid | | Conductive fluid | |
|---|---|---|---|
| Compound | Amount | Compound | Amount |
| SIP 6827 | 20% | water | 40% |
| DC702 | 60% | $Na_2SO_4$ | 0.2% |
| 1,8-dichlorooctane | 20% | MPG | 60% | d ($g/cm^3$): 1.0423  d ($g/cm^3$): 1.0434
n: 1.4875  n: 1.3995
Δd ($g/cm^3$): 0.0011
Δn: 0.088
Average viscosity (cSt): 10.3

Composition 4:

| Non-conductive fluid | | Conductive fluid | |
|---|---|---|---|
| Compound | Amount | Compound | Amount |
| SIP 6827 | 16.4% | LiBr | 1.5% |
| DC702 | 58% | water | 53.35% |
| 1,8-dichlorooctane | 25% | MPG | 45% |
| BHT | 0.6% | Acticide ® MBS | 0.15% | d ($g/cm^3$): 1.0448  d ($g/cm^3$): 1.0464
n: 1.4905  n: 1.3870
γ mN/m: 26.34  γ mN/m: 45.94
Δd ($g/cm^3$): 0.0016
Δn: 0.1035
Average viscosity (cSt): 7.9
Contact angle $\theta_n$ (°) on Parylene C: 10.2

Composition 5:

| Non-conductive fluid | | Conductive fluid | |
|---|---|---|---|
| Compound | Amount | Compound | Amount |
| Isopar ® V | 49.3% | AcOK 20% | 75% |
| o-bromoethylbenzene | 50.7% | Ethanol | 25% | d ($g/cm^3$): 1.0224  d ($g/cm^3$): 1.0270
n: 1.4880  n: 1.3672
Δd ($g/cm^3$): 0.0046
Δn: 0.1208
Average viscosity (cSt): 3.5
Contact angle $\theta_n$ (°) on Parylene C: <5

Composition 6:

| Non-conductive fluid | | Conductive fluid | |
|---|---|---|---|
| Compound | Amount | Compound | Amount |
| Isopar ® V | 19% | water | 53.85% |
| Chlorooctane | 19.4% | LiBr | 6% |
| p-bromoethylbenzene | 61% | Ethylene Glycol | 20% |
| BHT | 0.6% | MPG | 20% |
| | | Acticide ® MBS | 0.15% | d ($g/cm^3$): 1.0893  d ($g/cm^3$): 1.0889
n: 1.4915  n: 1.3870
Δd ($g/cm^3$): 0.0004
Δn: 0.1045
Average viscosity (cSt): 2.8
Contact angle $\theta_n$ (°) on Parylene C: 10.2

Composition 7:

| Non-conductive fluid | | Conductive fluid | |
|---|---|---|---|
| Compound | Amount | Compound | Amount |
| Isopar ® V | 35.2% | water | 53.865% |
| p-bromoethylbenzene | 64.2% | LiBr | 5.985% |
| BHT | 0.6% | Ethylene Glycol | 20% |

-continued

| | | | |
|---|---|---|---|
| | MPG | 20% | |
| | Acticide ® MBS | 0.15% | | d (g/cm³): 1.0890      d (g/cm³): 1.0889
n: 1.5010              n: 1.3870
Δd (g/cm³): 0.0001
Δn: 0.1140
Average viscosity (cSt): 3.2

Composition 8:

| Non-conductive fluid | | Conductive fluid | |
|---|---|---|---|
| Compound | Amount | Compound | Amount |
| DC702 | 65% | water | 47% |
| 1,8-dichlorooctane | 35% | Na₂SO₄ | 0.2% |
| | | EG | 53% | d (g/cm³): 1.0696      d (g/cm³): 1.0704
n: 1.4965              n: 1.3865
Δd (g/cm³): 0.0008
Δn: 0.110
Average viscosity (cSt): 7.7
Contact angle θₙ (°) on Parylene C: 15.1

Composition 9:

| Non-conductive fluid | | Conductive fluid | |
|---|---|---|---|
| Compound | Amount | Compound | Amount |
| SIP 6827 | 20% | water | 40% |
| DC702 | 60% | Na₂SO₄ | 0.2% |
| 1,8-dichlorooctane | 20% | MPG | 60% | d (g/cm³): 1.0488      d (g/cm³): 1.0438
n: 1.4880              n: 1.399
Δd (g/cm³): 0.0013
Δn: 0.0881
Average viscosity (cSt): 10.3
Contact angle θₙ (°) on Parylene C: 14

Composition 10:

| Non-conductive fluid | | Conductive fluid | |
|---|---|---|---|
| Compound | Amount | Compound | Amount |
| p-bromopropylbenzene | 68% | water | 49.2 |
| Isopar ® V | 32% | AcOK | 10.8% |
| | | MPG | 40% | d (g/cm³): 1.0846      d (g/cm³): 1.0844
n: 1.50                n: 1.3915
Δd (g/cm³): 0.0002
Δn: 0.1085
Average viscosity (cSt): 4.3
Contact angle θₙ (°) on Parylene C: 12

Composition 11:

| Non-conductive fluid | | Conductive fluid | |
|---|---|---|---|
| Compound | Amount | Compound | Amount |
| Hexamethyldigermane | 35% | water | 46.8% |
| Isopar V | 15% | AcOK | 2.88% |
| 1,8-dichlorooctane | 50% | EG | 37% |
| | | Ethanol | 15% | d (g/cm³): 1.0331      d (g/cm³): 1.0329
n: 1.4595              n: 1.3820
Δd (g/cm³): 0.0002
Δn: 0.0775
Average viscosity (cSt): 3.3
Contact angle θₙ (°) on Parylene C: 8.6

Composition 12:

| Non-conductive fluid | | Conductive fluid | |
|---|---|---|---|
| Compound | Amount | Compound | Amount |
| SID 4556 | 40% | water | 48% |
| 1-bromononane | 60% | AcOK20% | 2% |
| | | MPG | 50% | d (g/cm³): 1.0411      d (g/cm³): 1.0399
n: 1.4640              n: 1.3985
Δd (g/cm³): 0.0012
Δn: 0.0655
Average viscosity (cSt): 4.6

Composition 13:

| Non-conductive fluid | | Conductive fluid | |
|---|---|---|---|
| Compound | Amount | Compound | Amount |
| PMM11 | 70% | water | 46.8% |
| o-bromoethylbenzene | 30% | AcOK20% | 1.2% |
| | | EG | 52% | d (g/cm³): 1.0691      d (g/cm³): 1.0686
n: 1.4970              n: 1.3857
Δd (g/cm³): 5 10⁻⁴
Δn: 0.111
Average viscosity (cSt): 3.7
Contact angle θₙ (°) on Parylene C: 6

Composition 14:

| Non-conductive fluid | | Conductive fluid | |
|---|---|---|---|
| Compound | Amount | Compound | Amount |
| SID 4556 | 100% | water | 55% |
| | | AcOK20% | 20% |
| | | Ethanol | 25% | d (g/cm³): 0.979       d (g/cm³): 0.9803
n: 1.4774              n: 1.3515
Δd (g/cm³): 1.3 10⁻³
Δn: 0.1260

Average viscosity (cSt): 4.7
Contact angle $\theta_n$ (°) on Parylene C: 13.3
Contact angle $\theta_n$ (°) on Teflon ® AF1601: 12.9

Composition 15:

| Non-conductive fluid | | Conductive fluid | |
|---|---|---|---|
| Compound | Amount | Compound | Amount |
| DC 702 | 59% | water | 47% |
| 1-bromodecane | 41% | $Na_2SO_4$ | 0.2% |
| | | Ethylene Glycol | 53% | d (g/cm³): 1.0687    d (g/cm³): 1.0688
n: 1.4935    n: 1.3863
$\Delta$d (g/cm³): $10^{-4}$
$\Delta$n: 0.1072
Average viscosity (cSt): 7.7
Contact angle $\theta_n$ (°) on Parylene C: <5

Composition 16:

| Non-conductive fluid | | Conductive fluid | |
|---|---|---|---|
| Compound | Amount | Compound | Amount |
| SIP 6827 | 18% | water | 39.8% |
| DC702 | 52% | $Na_2SO_4$ | 0.2% |
| 1-bromododécane | 30% | MPG | 60% | d (g/cm³): 1.0459    d (g/cm³): 1.0424
n: 1.4861    n: 1.399
$\Delta$d (g/cm³): 0.0035
$\Delta$n: 0.0871
Average viscosity (cSt): 9.2
Contact angle $\theta_n$ (°) on Parylene C: 6

Composition 17:

| Non-conductive fluid | | Conductive fluid | |
|---|---|---|---|
| Compound | Amount | Compound | Amount |
| PMM11 | 43% | water | 48% |
| 1-bromononane | 57% | AcOK20% | 2% |
| | | MPG | 50% | d (g/cm³): 1.0395    d (g/cm³): 1.0399
n: 1.4662    n: 1.3895
$\Delta$d (g/cm³): $4\,10^{-4}$
$\Delta$n: 0.0769
Average viscosity (cSt): 4.8

Composition 18:

| Non-conductive fluid | | Conductive fluid | |
|---|---|---|---|
| Compound | Amount | Compound | Amount |
| DC 702 | 54% | water | 25% |
| 1,8-dichlorooctane | 46% | AcOK20% | 25% |
| | | MPG | 50% | d (g/cm³): 1.0622    d (g/cm³): 1.0616
n: 1.4895    n: 1.3953
$\Delta$d (g/cm³): $6\,10^{-4}$
$\Delta$n: 0.0942
Average viscosity (cSt): 7.9
Contact angle $\theta_n$ (°) on Parylene C: 7.6
Contact angle $\theta_n$ (°) on Teflon ® AF1601: 16.1

Composition 19:

| Non-conductive fluid | | Conductive fluid | |
|---|---|---|---|
| Compound | Amount | Compound | Amount |
| PMM11 | 10% | water | 30% |
| DC702 | 30% | AcOK 20% | 10% |
| 1-bromononane | 60% | EG | 40% |
| | | MPG | 20% | d (g/cm³): 1.0791    d (g/cm³): 1.0755
n: 1.4758
$\Delta$d (g/cm³): 0.0036
Average viscosity (cSt): 5.1
Contact angle $\theta_n$ (°) on Parylene C: 13

Composition 20:

| Non-conductive fluid | | Conductive fluid | |
|---|---|---|---|
| Compound | Amount | Compound | Amount |
| SIP 6827 | 49% | water | 14% |
| DC702 | 51% | AcOK20% | 56% |
| | | Ethanol | 25% | d (g/cm³): 1.0095    d (g/cm³): 1.0091
$\Delta$d (g/cm³): $4\,10^{-4}$
Average viscosity (cSt): 7.9
Contact angle $\theta_n$ (°) Parylene C: 8.1

Composition 21:

| Non-conductive fluid | | Conductive fluid | |
|---|---|---|---|
| Compound | Amount | Compound | Amount |
| SIP 6827 | 27.7% | NaBr | 0.50% |
| DC 702 | 40% | water | 48.5 |
| Phenyltrimethylgermane | 32.3% | EG | 12% |
| | | TMG | 38% |
| | | Pentanol | 1% | d (g/cm3): 1.0434    d (g/cm3): 1.0447
n: 1.489    n: 1.38895
viscosity (cSt): 4.5    viscosity (cSt): 5.1
$\Delta$d (g/cm3): 0.0013
$\Delta$n: 0.10005
Average viscosity (cSt): 4.8

Composition 22:

| Non-conductive fluid | | Conductive fluid | |
|---|---|---|---|
| Compound | Amount | Compound | Amount |
| SIP 6823 (silane) | 21% | NaBr | 0.50% |
| DC 702 | 40% | water | 48.5 |
| Phenyltrimethylgermane | 39% | EG | 12% |
| | | TMG | 38% |
| | | Pentanol | 1% | d (g/cm3): 1.0411     d (g/cm3): 1.0447
n: 1.50747     n: 1.38895
viscosity (cSt): 3.0     viscosity (cSt): 5.1
Δd (g/cm3): 0.0036
Δn: 0.11852
Average viscosity (cSt): 4.1

Composition 23:

| Non-conductive fluid | | Conductive fluid | |
|---|---|---|---|
| Compound | Amount | Compound | Amount |
| SIP 6827.0 | 23.00% | NaBr | 0.50% |
| Phenyltrimethylgermane | 77.00% | Water | 49.50% |
| | | EG | 39.00% |
| | | MPG | 10.00% |
| | | Pentanol | 1.00% | d (g/cm3): 1.0578     d (g/cm3): 1.0602
n: 1.48735     n: 1.38564
viscosity (cSt): 1.3     viscosity (cSt): 4.0
Δd (g/cm3): 0.0024
Δn: 0.10171
Average viscosity (cSt): 2.7

Composition 24:

| Non-conductive fluid | | Conductive fluid | |
|---|---|---|---|
| Compound | Amount | Compound | Amount |
| Phenyltrimethylgermane | 66.00% | NaBr | 0.50% |
| DMS T15 | 14.00% | Water | 48.5 |
| SIP 6827.0 | 20.00% | EG | 12% |
| | | TMG | 38% |
| | | Pentanol | 1% | d (g/cm3): 1.0467     d (g/cm3): 1.0447
n: 1.47536     n: 1.38895
viscosity (cSt): 2.5     viscosity (cSt): 5.1
Δd (g/cm3): 0.002
Δn: 0.08641
Average viscosity (cSt): 3.8

Composition 25:

| Non-conductive fluid | | Conductive fluid | |
|---|---|---|---|
| Compound | Amount | Compound | Amount |
| DC 200/10 | 10.00% | NaBr | 5.00% |
| Phenyltrimethylgermane | 90.00% | water | 47.00% |
| | | EG | 47.00% |
| | | Pentanol | 1.00% | d (g/cm3): 1.09805     d (g/cm3): 1.1016
n: 1.4942     n: 1.3908
viscosity (cSt): 1.3     viscosity (cSt): 3.8
Δd (g/cm3): 0.0031
Δn: 0.1034
Average viscosity (cSt): 2.5

Composition 26:

| Non-conductive fluid | | Conductive fluid | |
|---|---|---|---|
| Compound | Amount | Compound | Amount |
| DMS-T02 | 34.00% | NaBr | 2.50% |
| diphényldiméthylgermane | 66.00% | water | 51.00% |
| | | EG | 45.30% |
| | | Pentanol | 1.00% |
| | | 1-Hexanol | 0.20% | d (g/cm3): 1.0792     d (g/cm3): 1.0774
n: 1.5113     n: 1.3822
viscosity (cSt): 3.8     viscosity (cSt): 3.6
Δd (g/cm3): 0.0019
Δn: 0.1291
Average viscosity (cSt): 3.7

Composition 27:

| Non-conductive fluid | | Conductive fluid | |
|---|---|---|---|
| Compound | Amount | Compound | Amount |
| Diphényldiméthylgermane | 76.00% | NaBr | 2.50% |
| Isopar P | 24.00% | water | 48.50% |
| | | EG | 48.00% |
| | | Pentanol | 1% | d (g/cm3): 1.0833     d (g/cm3): 1.0811
n: 1.5405     n: 1.3846
viscosity (cSt): 4.1     viscosity (cSt): 3.9
Δd (g/cm3): 0.0022
Δn: 0.1559
Average viscosity (cSt): 4.0

The following Table 8 provides some examples of Si- and/or Ge-based compounds useful in the present invention.

TABLE 8

| | Ratio Ph/Si | Ratio Ph/Me |
|---|---|---|
| SIP 6827.0 ® (ABCR GmbH, Phenyltris(trimethyl-siloxy)silane) | 0.25 | 0.11 |
| PMM-011 (750-FTF-EX ®, 3M; Poly(phenylmethyl-siloxane) | | |
| SID 4556 (ABCR GmbH, 3,5-Diphenyloctamethyl-tetrasiloxane) | 0.5 | 0.25 |
| SIT 8662 (ABCR GmbH, 3,5,7-Triphenylnonamethyl-pentasiloxane) | 0.6 | 0.33 |
| DC 705 ® (Dow Corning, Trimethyl pentaphenyl trisiloxane) | 1.66 | 1.66 |
| PDM 7040 ® (Gelest, 1,1,5,5-Tetraphenyl-1,3,3,5-tetra-methyl trisiloxane) | 1.33 | 1 |
| PSDF 04 ® (1,1,5,5-tetraphenyl-1,3,3,5-tetramethyl-trisiloxane) | 1.33 | 1 |
| DC 704 ® (Dow Corning, Tetramethyl tetraphenyl trisiloxane) | 1.33 | 1 |

TABLE 8-continued

|  | Ratio Ph/Si | Ratio Ph/Me |
|---|---|---|
| SIP 6719.5 ® (ABCR GmbH, 1,1,3,5,5-Pentaphenyl-1,3,5-trimethyl siloxane) | 1.66 | 1.66 |
| DC 702 ® (mixture of cyclosiloxanes and phenylated siloxanes, Dow Corning) | >1.33 | >1.33 |

EMBODIMENT EXAMPLES

Embodiment Example 1

A liquid lens of the type of the one represented on FIG. 1 has been made using Parylene C as the insulating substrate 2 on the lower plate 7.

| Non-conductive fluid | | Conductive fluid | |
|---|---|---|---|
| Isopar V | 35.2% | Water | 53.865% |
| p-bromoethylbenzene | 64.2% | LiBr | 5.985% |
| BHT | 0.6% | Biocide | 0.15% |
| | | Ethylene glycol | 20% |
| | | 1,2 propane diol | 20% |

Natural contact angle with Parylene C: below 16°.

On FIG. 9, focal has been plotted as a function of voltage for the lens. The focal was almost undistinguishable, whether voltage is increasing or decreasing.

Embodiment Example 2

Same as embodiment example 1 wherein Parylene C is replaced by Parylene N.

Embodiment Example 3

A liquid lens of the type of the one represented on FIG. 1 has been made using Teflon® AF 1601 as a hydrophobic layer on top of Parylene C as an insulator on the lower plate. Non-conductive fluid and conductive fluid are the same as in embodiment example 1.

Natural contact angle with Teflon® AF: below 16°.

Low contact angle hysteresis was also observed.

Embodiment Example 4

Same as embodiment example 3 wherein Teflon® AF AF1601 is replaced by Teflon® AF 1600.

TABLE 9

Compared data of various insulating materials

| | Teflon ® AF 1600-1601 | Cytop ® | DVS-BCB polymer | Parylene C | Parylene F |
|---|---|---|---|---|---|
| Relative dielectric constant ($\epsilon_r$) at 1 kHz and 20° C. | 1.93 | 2.1-2.2 | 2.7 | 3.1 | 2.2 |
| Dissipation factor at 20° C. | 0.0001 to 0.001 at 1 MHz | 0.0007 at 60 Hz | 0.0008 at 1 MHz | 0.02 at 1 KHz | 0.002 at 1 KHz |
| Breakdown voltage (MV/cm) | 1.1 | 1.1 | 3 | 1.85-2.2 | 2.12 |
| Surface energy (mN/m) at 20° C. | 15.5 ± 1 | 19 ± 1 | 36 ± 1 | 41 ± 1 | 31 ± 1 |
| Water absorption (%) after 24 h | | 0.01 at 60° C. | <0.23 | <0.1 at 23° C. | <0.01 at 23° C. |
| Tg (° C.) | 160 | 108 | >200 | 35-80 | >530 (Td)* |

*Degradation temperature

Embodiment Example for Parylene F (AF-4)

This polymer is coated on the lower plate of an optical lens driven by electrowetting by CVD (see U.S. Pat. No. 3,342,754).

The obtained film of Parylene F (AF-4) forms the insulating and hydrophobic layer in the liquid lens.

Parylene C, N, F or VT-4 may also be used, as a protective layer for other insulating layers that could be damaged by the conductive and/or non conductive fluids, in various multi-layer systems, such as for example lower plate/insulating (dielectric) layer/Parylene C or Parylene N, or Parylene VT-4, or Parylene F (AF-4).

Examples of such systems are the following:

lower plate/insulating layer/Parylene C, N, F or VT-4;

lower plate/SiO$_2$/Parylene C, N, F or VT-4;

lower plate/Si$_3$N$_4$/Parylene C, N, F or VT-4;

lower plate/Parylene C/Parylene N, F or VT-4;

lower plate/Parylene N/Parylene C, F or VT-4;

lower plate/BCB polymer/Parylene C, N, F or VT-4;

Embodiment Example for
Divinylsiloxane-Benzocyclobutene (DVS-BCB)
Polymer

DVS-BCB polymer is coated on the lower plate of an optical lens driven by electrowetting, by spin coating or dip coating or CVD (see U.S. Pat. No. 3,342,754). The obtained film of DVS-BCB polymer forms the insulating and hydrophobic layer in the liquid lens.

An example of the detailed process of spin coating DVS-BCB polymer is the following:

Use BCB 3022—46® (Dow Chemical)
Adhesion promoter: AP 3000® (Dow Chemical)
Sample Cleaning of the lower plate:
   acetone 5 min 50° C. ultrasonic;
   ethanol 5 min 50° C. ultrasonic;
   deionized water 5 min 50° C. in an ultrasonic bath.
Adhesion promoter AP 3000: three droplets
Spin coating:
   1800 rpm—5 s;
   3600 rpm—20 s;
   Hot plate 1 min at 150° C.
BCB (3022-46) deposition: 4 droplets
Spin coating:
   1800 rpm—30 s.
Hot plate under nitrogen at 285° C. in 4 steps:
   1—30 min under nitrogen at Room temperature;
   2—ramp up 285° C. under nitrogen (power 70 w: 25 min);
   3—one minute at 285° C.;
   4—return to room temperature under nitrogen.

DVS-BCB polymer may also be used as a protective layer for other insulating layers that could be damaged by the conductive and/or non conductive fluids, in various multi-layer systems, such as for example lower plate/insulating (dielectric) layer/DVS-BCB polymer.

Examples of such systems are the following:

Lower plate/insulating layer (organic or inorganic materials)/DVS-BCB polymer

Lower plate/SiO$_2$/DVS-BCB polymer

Lower plate/Si$_3$N$_4$/DVS-BCB polymer

Lower plate/Parylene C/DVS-BCB polymer

Lower plate/Parylene N/DVS-BCB polymer

Lower plate/Parylene F/DVS-BCB polymer

Lower plate/Parylene VT-4/DVS-BCB polymer

Embodiment Example for Cytop®

Cytop is a perfluoro polymer bearing perfluorofurane, obtained by cyclopolymerization of perfluoro(alkenyl vinyl ether) and commercialized by Asahi Glass Co. under the trade name Cytop® (Cyclic Transparency Optical Polymer).

Cytop can be used as an insulating and hydrophobic layer in the liquid lens.

Cytop may be used as a protective layer for other insulating layers that could be damaged by the conductive and/or non conductive fluids, in various multi-layer systems, such as for example lower plate/insulating (dielectric) layer/Cytop Examples of such systems are the following:

lower plate/insulating layer/Cytop lower plate/SiO$_2$/Cytop lower plate/Si$_3$N$_4$/Cytop lower plate/Parylene C/Cytop lower plate/Parylene N/Cytop lower plate/Parylene F/Cytop lower plate/Parylene VT-4/Cytop lower plate/DVS-BCB polymer/Cytop

The invention claimed is:

1. An optical electrowetting device comprising a conductive fluid and a non-conductive fluid, said fluids being non miscible, and a planar insulating substrate on which both fluids are in contact and form a triple interface, wherein the natural contact angle of the non-conductive fluid on the planar insulating substrate in presence of the conductive fluid, through the non-conductive fluid, is comprised between 0° and 20°, and wherein the planar insulating substrate has a surface energy above 30 mN/m and the non-conductive fluid contains a compound of surface tension equal to or above 28 mN/m.

2. The optical electrowetting device of claim 1, wherein the natural contact angle is comprised between 5° and 16°.

3. The optical electrowetting device of claim 1, wherein the natural contact angle $\theta_n$ is such that $0° \leq \theta_n \leq 20°$ over a range of temperatures comprised between −20° C. and +70° C.

4. The optical electrowetting device of claim 1, wherein the difference $d_{st}$ between the surface tension of the non-conductive fluid and the surface energy of the planar insulating substrate is within the range $-15 < d_{st} < +15$ mN/m.

5. The optical electrowetting device of claim 1, wherein the planar insulating substrate surface energy has a polar component comprised between 0 mN/m and 2 mN/m.

6. The optical electrowetting device of claim 1, wherein the planar insulating substrate is made of, or comprises an upper layer which is made of, a para-xylylene linear polymer or an aromatic vinylsiloxane polymer.

7. The optical electrowetting device of claim 6, wherein the planar insulating substrate is made of, or comprises an upper layer which is made of one of Parylene C, Parylene D, Parylene N, Parylene F, Parylene AF-4, or Parylene VT-4.

8. The optical electrowetting device of claim 6, wherein the planar insulating substrate is made of, or comprises an upper layer which is made of, divinylsiloxane-benzocyclobutene (DVS-BCB) polymer.

9. The optical electrowetting device of claim 1, wherein the whole of the non-conductive and the conductive fluids has a mean arithmetic cinematic viscosity of between 1.5 cSt and 40 cSt, within a temperature range of −10° C. to +60° C.

10. The optical electrowetting device of claim 1, wherein the planar insulating substrate is made of, or comprises an upper layer which is made of, a para-xylylene linear polymer, the conductive fluid comprises water and an organic or inorganic salt, and the non-conductive fluid comprises halogenated alkane(s) and/or siloxane oil(s).

11. The optical electrowetting device of claim 10, wherein the planar insulating substrate is made of, or comprises an upper layer which is made of, Parylene C, the conductive fluid comprises water and an inorganic salt, and the non-conductive fluid comprises halogenated alkane(s) and siloxane oil(s).

12. The optical electrowetting device of claim 11, comprising:
   a planar insulating substrate made of, or comprising an upper layer made of, Parylene C;
   a conductive fluid comprising:
      i) from 35 weight % to 45 weight % of water,
      ii) from 0.15 weight % to 0.25 weight % of sodium sulphate, iii) from 55 weight % to 65 weight % of monopropylene glycol (MPG); and a non-conductive fluid comprising:
   a) from 15 weight % to 25 weight % of phenyltris (trimethylsiloxy) silane,
   b) from 55 weight % to 65 weight % of a cyclosiloxane and phenylated siloxane mixture having a Ph/Si ratio less than 1.33 and a Ph/Me ratio less than 1.33,
   c) from 15 weight % to 25 weight % of 1,8-dichlorooctane, and
   d) from 0.4 weight % to 0.8 weight % of a butylated hydroxyl toluene.

13. The optical electrowetting device of claim 1, which is one of a variable focus liquid lens, an optical diaphragm, or an optical zoom.

14. An apparatus comprising an optical electrowetting device according to claim 13, and a driver or electronic means for controlling the interface.

15. The apparatus of claim 14, wherein the driver or electronic means further comprises means to apply an A.C. voltage to the conductive fluid.

16. The apparatus of claim 15, which is one of a camera, a cell phone, a telemeter, an endoscope, or a dental video camera.

17. The optical electrowetting device of claim 10, wherein the planar insulating substrate is made of, or comprises an upper layer which is made of, one of Parylene C, Parylene D, Parylene N, Parylene F, Parylene AF-4, or Parylene VT-4.

18. The optical electrowetting device of claim 12, further comprising a biocide agent up to 0.2%.

* * * * *